(12) United States Patent
Huang et al.

(10) Patent No.: US 6,643,064 B2
(45) Date of Patent: Nov. 4, 2003

(54) OPTICAL SIGNAL INTERLEAVER

(75) Inventors: Chen-Bin Huang, Hsichih (TW); Chieh Hu, Hsichih (TW); Lih-Gen Sheu, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 67 days.

(21) Appl. No.: 09/915,496

(22) Filed: Jul. 27, 2001

(65) Prior Publication Data

US 2002/0186467 A1 Dec. 12, 2002

(30) Foreign Application Priority Data

Jun. 7, 2001 (TW) ........................................ 90113767 A

(51) Int. Cl.$^7$ ................................................. G02B 5/30
(52) U.S. Cl. ........................... 359/497; 359/495; 385/36
(58) Field of Search ................................ 359/484, 494, 359/495, 496, 497; 385/24, 31, 36

(56) References Cited

U.S. PATENT DOCUMENTS

| 6,169,626 | B1 | | 1/2001 | Chen et al. | |
|---|---|---|---|---|---|
| 6,212,313 | B1 | * | 4/2001 | Li | ................ 385/24 |
| 6,400,508 | B1 | * | 6/2002 | Liu | ............. 359/495 |

* cited by examiner

*Primary Examiner*—Audrey Chang
*Assistant Examiner*—Craig Curtis
(74) *Attorney, Agent, or Firm*—Birch, Stewart, Kolasch & Birch, LLP

(57) ABSTRACT

This specification discloses a light signal interleaver, which can separate a light signal into two light signals with a large interval in between. A birefringent plate is used as a light signal interleaver to separate all wavelengths in a light signal into an O-ray and an E-ray. Therefore, the invention can increase the total transmission capacity under the existent network structure.

36 Claims, 25 Drawing Sheets

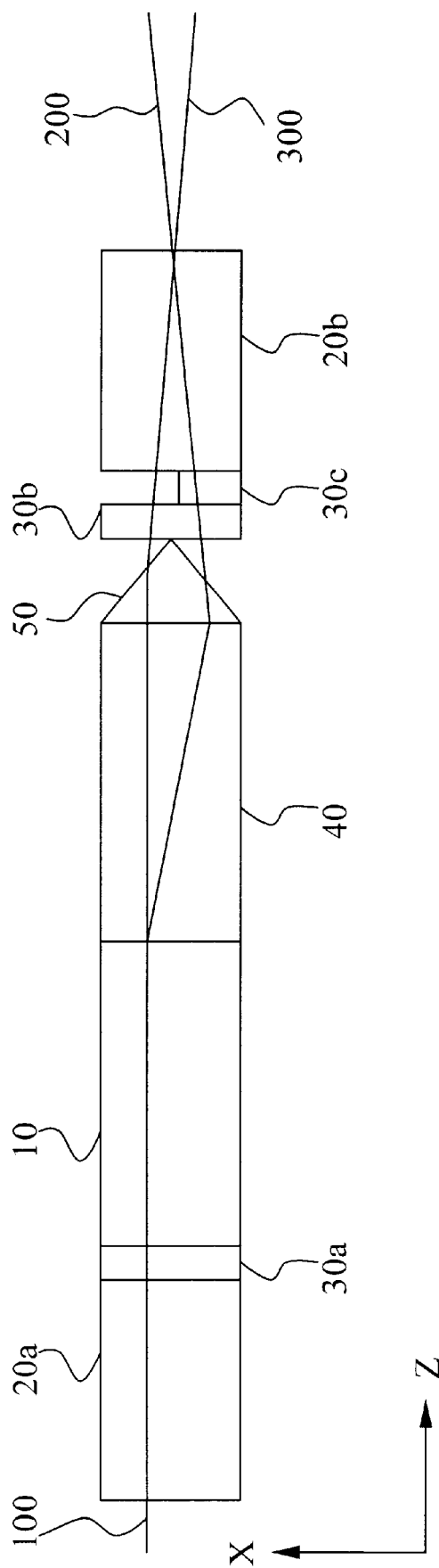
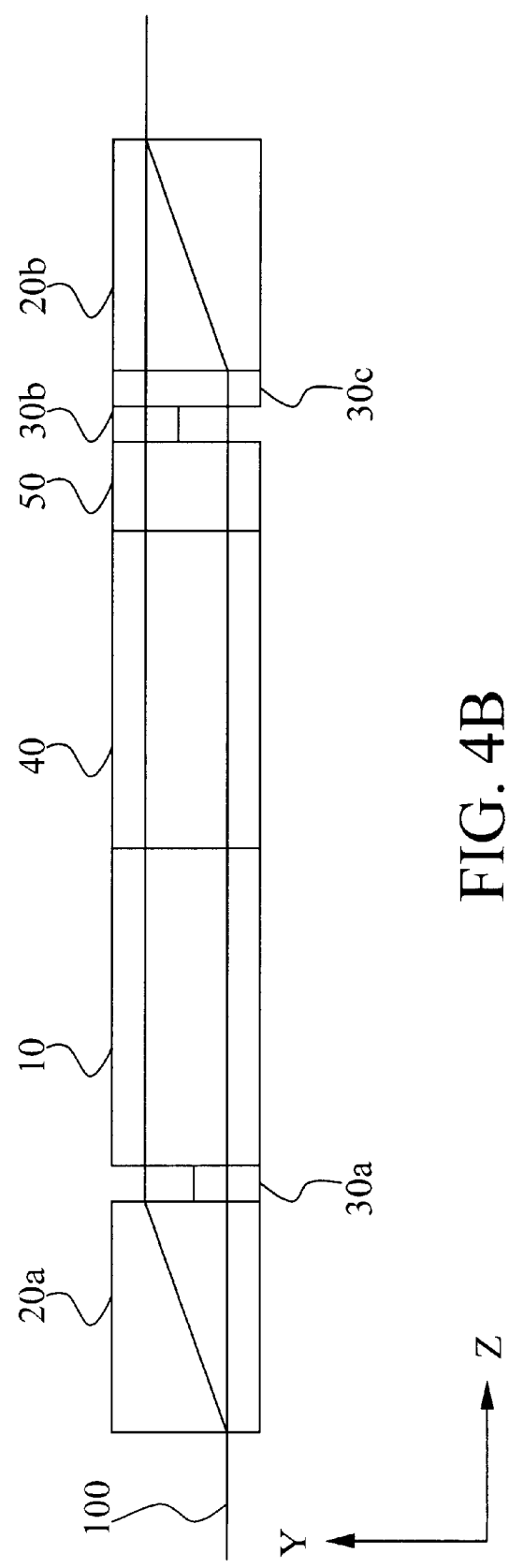
FIG. 4A
FIG. 4B

OPTICAL SIGNAL INTERLEAVER

BACKGROUND OF THE INVENTION

1. Field of Invention

The invention relates to an optical signal device and, in particular, to an optical signal interleaver that can decrease the interval between adjacent channels and thus increase the total transmission capacity under the existing network structure.

2. Related Art

Along with the emergence of new technologies and increasing Internet uses, the communication transmission capacity has been expanding continuously. Network equipment providers have to provide a larger bandwidth for transmitting more and more AV signals. The technologies of WDM (Wavelength Division Multiplexing) and DWDM (Dense WDM) can largely expand the total transmission capacity under the current optical fiber structure.

DWDM systems enable the transmission of optical carrying different signals through the same optical fiber. The multiplexing/de-multiplexing and adding/dropping of wavelengths are often achieved using optical thin film filters. However, the channel width of optical thin film filters are difficult to be lowered and may easily age with time under high powers. Therefore, lowering the interval between channels in a transmission system is a better way to increase the total transmission capacity, as shown in FIG. 1 where 2f becomes f. For existing optical thin film filter systems, the interval between channels is 200 GHz. If one can lower the adjacent chancel interval down to 100 GHz without modifying the existing optical thin film filter network structure, the total transmission capacity can be doubled by doubling the number of channels.

A few solutions had been proposed before. For example, the U.S. Pat. No. 6,169,626 discloses a periodic spectrometer structure composed of an air-layer Fabry-Perot and a spectrometric prism. Its advantage is that there is a good temperature stability when the thermal expansion of the glass for the air-layer Fabry-Perot. On the other hand, it has the drawback of a larger volume and a lot of components.

SUMMARY OF THE INVENTION

An object of the invention is to provide an optical signal interleaver, which, under the condition of same wavelength intervals such as ITU (International Telecommunication Union), multiplexes/de-multiplexes an optical signal with interleaving wavelengths (odd ITU wavelengths and even ITU wavelengths) from an optical fiber, thus increasing the total transmission capacity under the current network structure.

In accordance with the disclosed optical signal interleaver, a plurality of birefringent plates are used to form an optical signal interleaving mechanism to separate all the wavelengths in an optical signal into an E-ray and an O-ray. Therefore, the interval can be decreased. At the same time, using the optical signal interleaver comprised of a polarization beam splitter/combiner, a polarization rotator, a polarization beam displacer, and a beam angle deflector, the incident beam output from an optical fiber collimator (the light signal with all wavelengths) can be separated into an O-ray and an E-ray, which then enter two ports of a double optical fiber collimator. Thus, the invention can increase the total transmission capacity under the current network structure.

BRIEF DESCRIPTION OF THE DRAWINGS

The present invention will become more fully understood from the detailed description given hereinbelow illustration only, and thus are not limitative of the present invention, and wherein:

FIGS. 4A and 4B are schematic views of the structure and the optical path in the first embodiment of the invention;

DETAILED DESCRIPTION OF THE INVENTION

Figure 1:
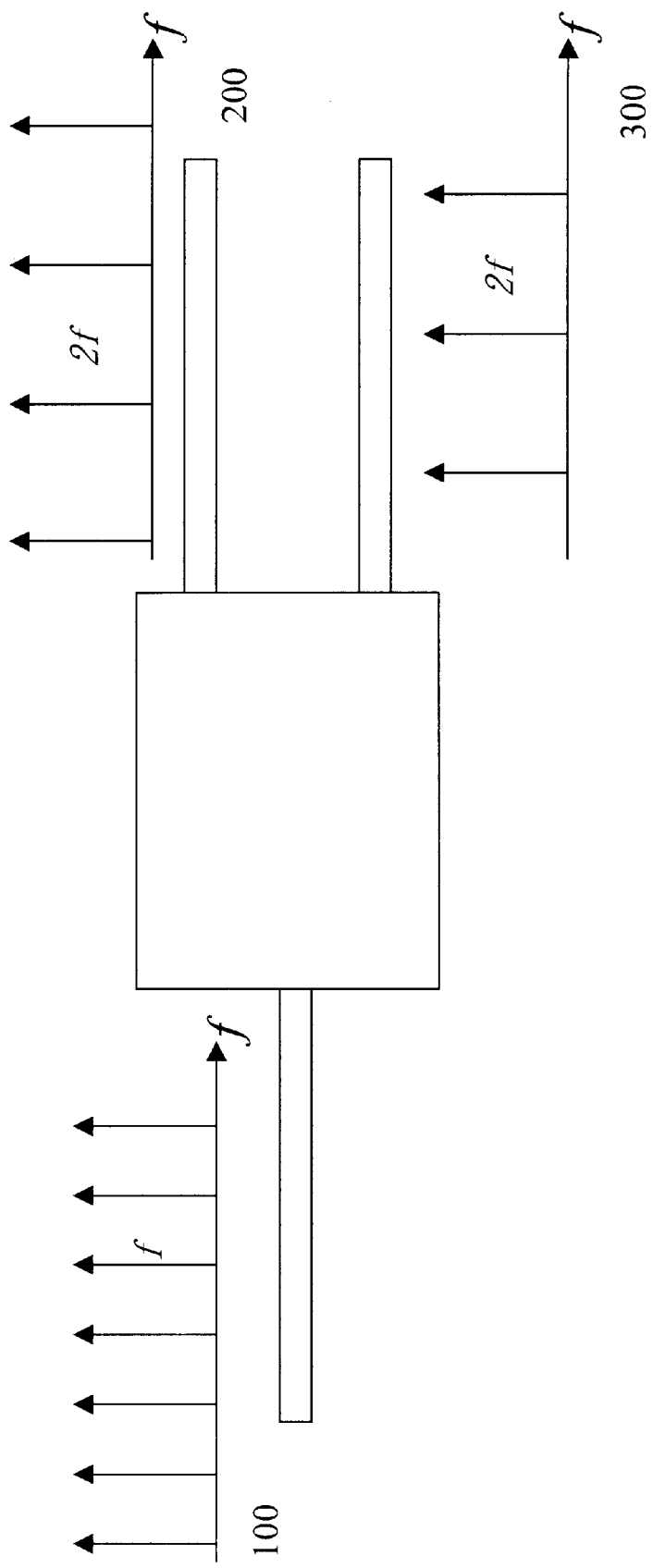
FIG. 1 is a schematic view of separating waves according to the invention.
Figure 2A:
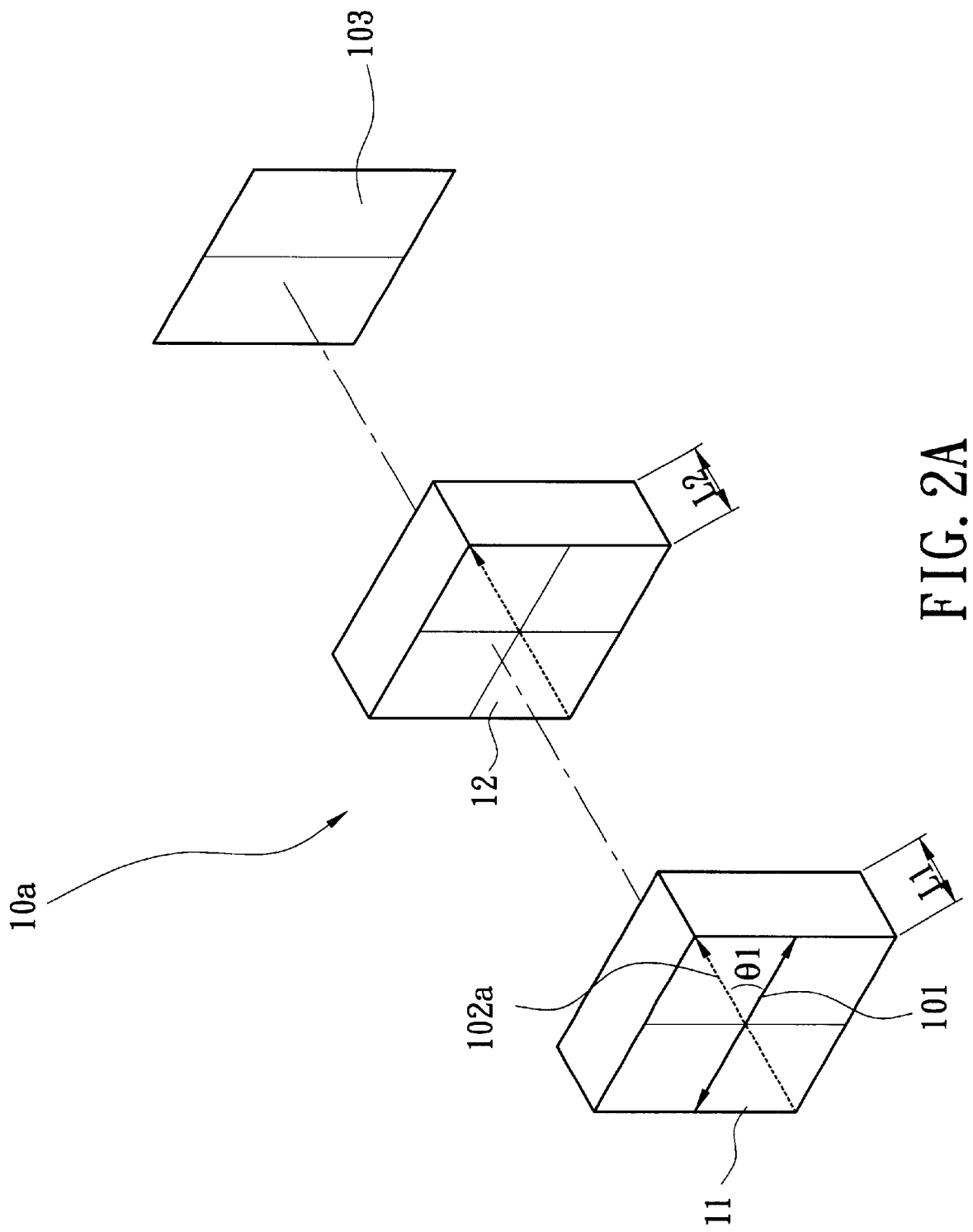
FIG. 2A is a schematic view of the single-order optical signal interleaving mechanism.
Figure 2B:
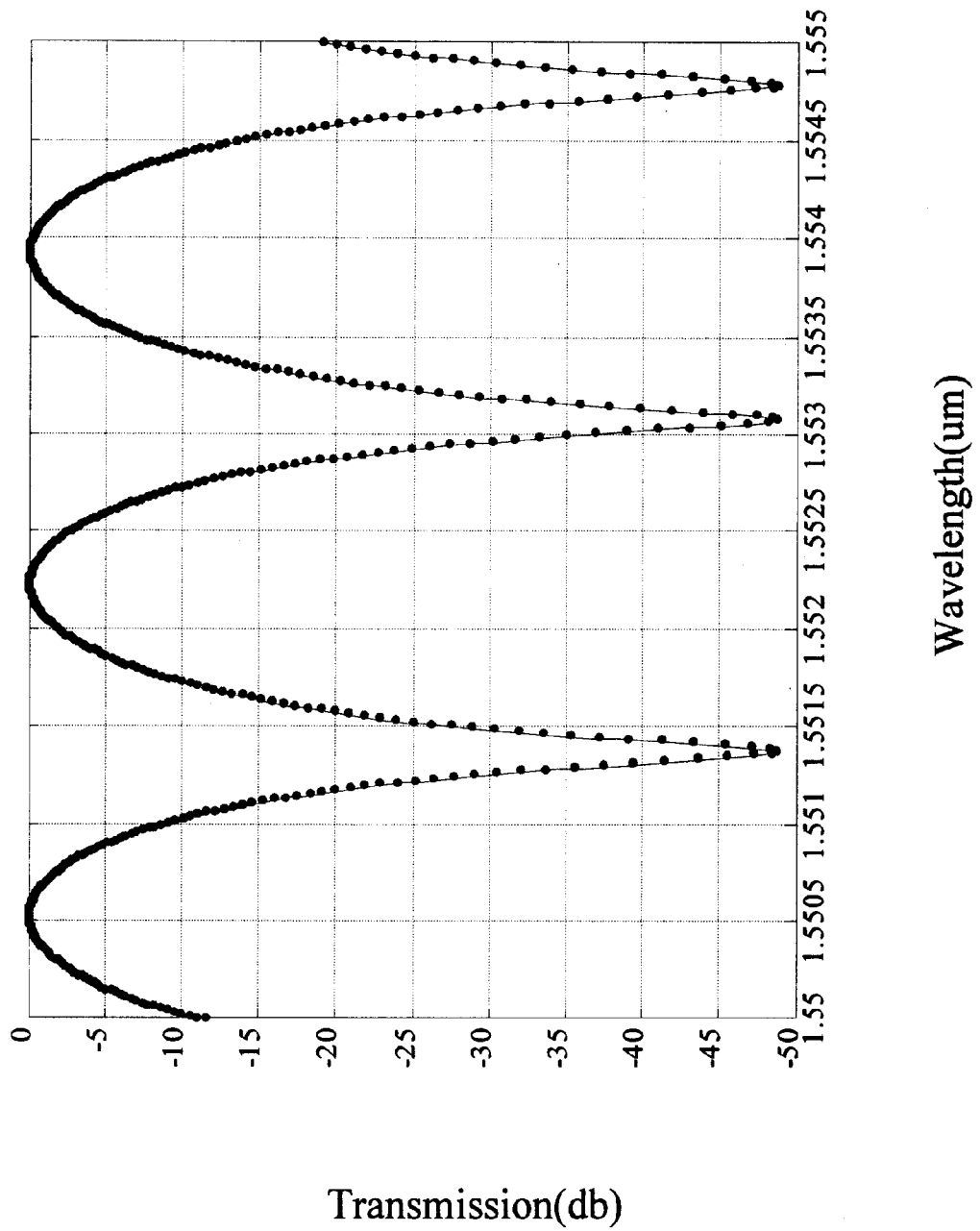
FIG. 2B is a transmission spectrum of FIG. 2A.

The optical signal interleaver of the invention is schematically shown in FIG. 2A. A single-order light optical interleaving mechanism 10a includes two birefringent plates 11, 12 and an analyzer 103. The optical axis 102a of the birefringent plate 11 is orthogonal to the propagation direction of incident beam 101 and has an angle $\theta_1$ subtended with the polarization of the incident beam 101. The birefringent plate 12 is used to stabilize temperature drift. The thermal expansion coefficient and thermal optical coefficient of the birefringent material ($LiNbO_3$, $YVO_4$, Calcite, $TiO_2$, $MgF_2$, $PbMoO_4$, and $\alpha$-BBO) for the birefringent plates 11, 12 determine the length $L_2$ of the birefringent plate 12 so that the interleaving effects of the single-order optical signal interleaving mechanism 10a can be kept stable in the operating temperature range. When $\theta_1$=45 degrees, the incident beam 101 encounters the analyzer 103 after passing through the birefringent plates 11, 12. The transmission spectrum is shown in FIG. 2B. By appropriately selecting the length $L_1$ of the birefringent plate 11, the channel spacing of the transmission spectrum can be controlled.

Figure 3A:
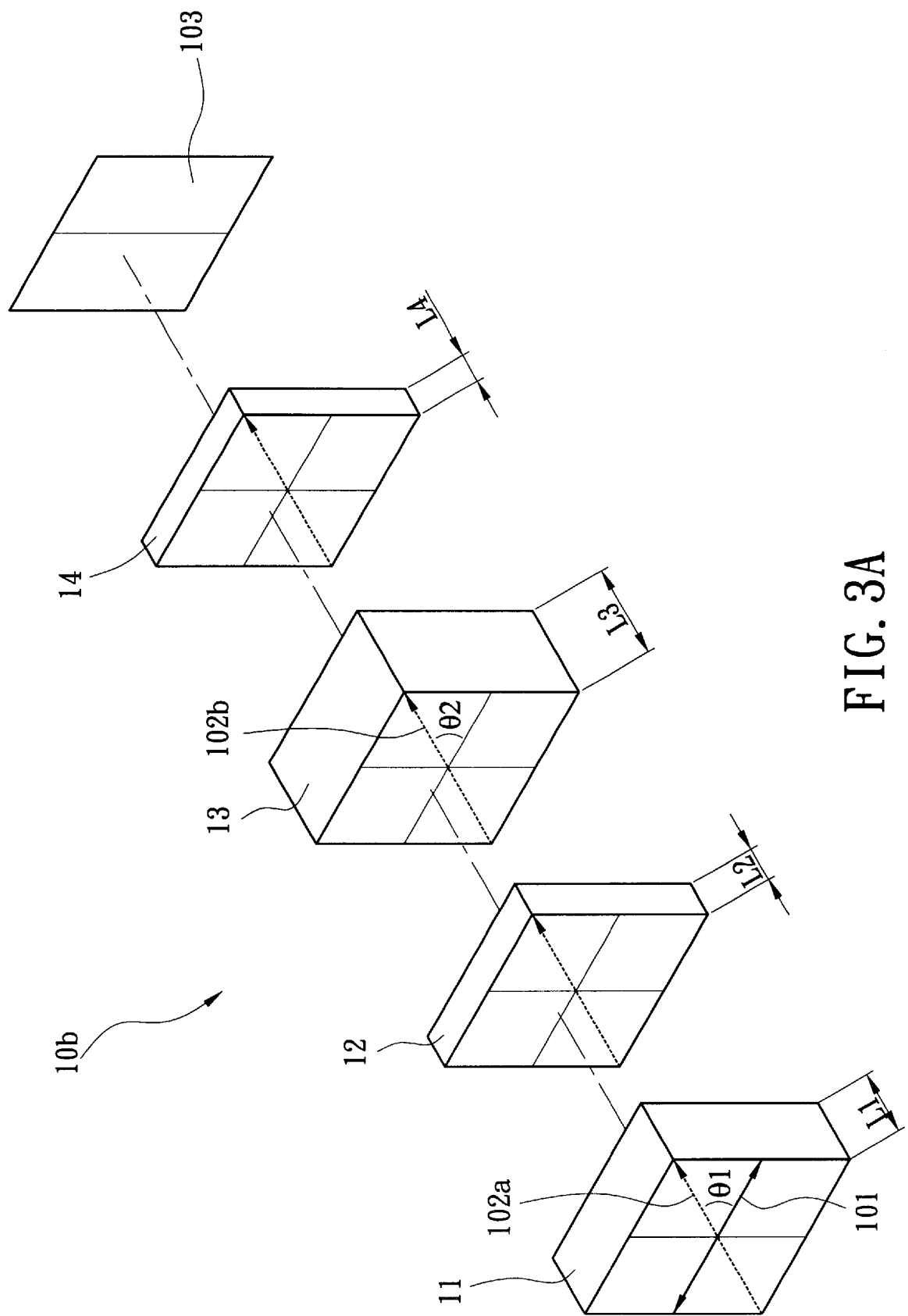
FIG. 3A is a schematic view of the double-order optical signal interleaving mechanism.
Figure 3B:
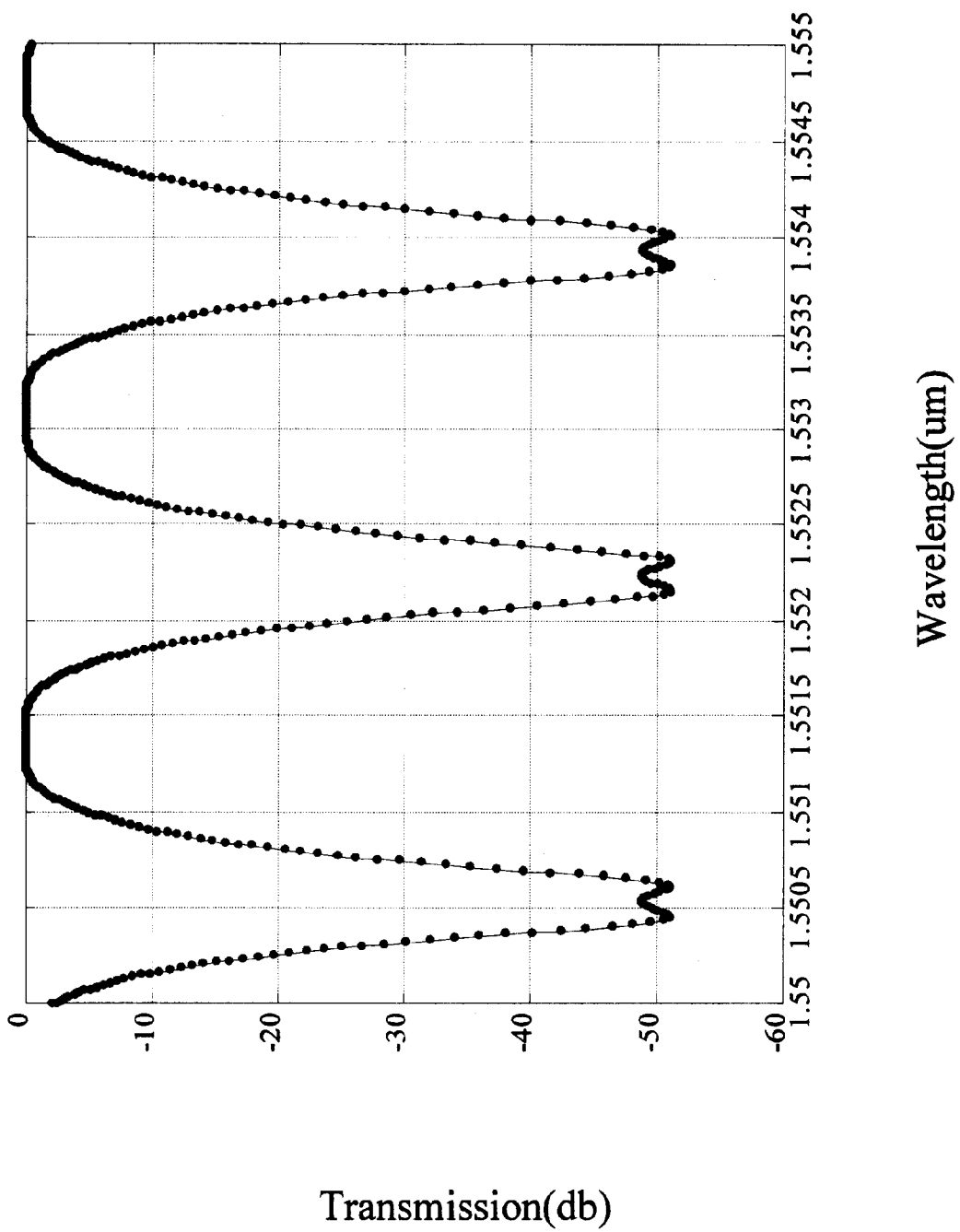
FIG. 3B is a transmission spectrum of FIG. 3A.

The invention also provides a double-order optical signal interleaving mechanism 10b, shown in FIG. 3A. This mechanism is obtained by adding two more birefringent plates 13, 14 in the single-order optical signal interleaving mechanism 10a. The length $L_3$ of the birefringent plate 13 is twice $L_1$. The optical axes 102a, 102b of the birefringent plates 11, 13 are orthogonal to the propagation direction of the incident beam 101 and have angles $\theta_1$ and $\theta_2$ subtended with the incident beam 101. Similarly, the birefringent plates 12, 14 are used to stabilize the temperature drift. The thermal expansion coefficient and thermal optical coefficient of the birefringent material for the birefringent plates 11, 13 determine the lengths $L_2$ and $L_4$ of the birefringent plates 12, 14 so that the interleaving effects of the double-order optical signal interleaving mechanism 10b are kept stable within the operating temperature range. When $\theta_1$=45 degrees, the incident beam 101 can encounter the analyzer 103 after passing through the birefringent plates 11, 12, 13, 14 by properly choosing the angle $\theta_2$ (such as –5 degrees). The transmission spectrum is shown in FIG. 3B. The passband width is increased and flattened. By appropriately selecting the length $L_1$ of the birefringent plate 11, the channel spacing of the transmission spectrum can be controlled.

As shown in FIGS. 4A and 4B, a first embodiment of the invention is a transmissive optical signal interleaver. It includes a first polarization beam splitter/combiner 20a, a first polarization rotator 30a, an optical signal interleaving mechanism 10 (the above-mentioned single-order optical signal interleaving mechanism 10a or double-order light signal interleaving mechanism 10b), a polarization beam displacer 40, a beam angle deflector 50, a second polarization rotator 30b, a third polarization rotator 30c and a second polarization beam splitter/combiner 20b. The incident beam 100 contains a light signal with all sorts of wavelengths ($\lambda_1$, $\lambda_2$, $\lambda_3$, $\lambda_4$ . . . ) output from the single optical fiber collimator. After passing through the transmissive optical signal interleaver, the incident beam 100 is separated into an Odd wavelengths beam 200 and an Even wavelengths beam-ray 300, which are directed to two ports of a dual fiber collimator. The polarization beam displacer 40 and the polarization beam splitter/combiner (including all the ones mentioned in this specification) can be birefringent crystals. The polarization rotator (including all the ones mentioned in this specification) can be a Faraday rotator or a half-wave plate. The beam angle deflector 50 can be optical glass or an optical crystal with a high refraction index.

Figure 5:
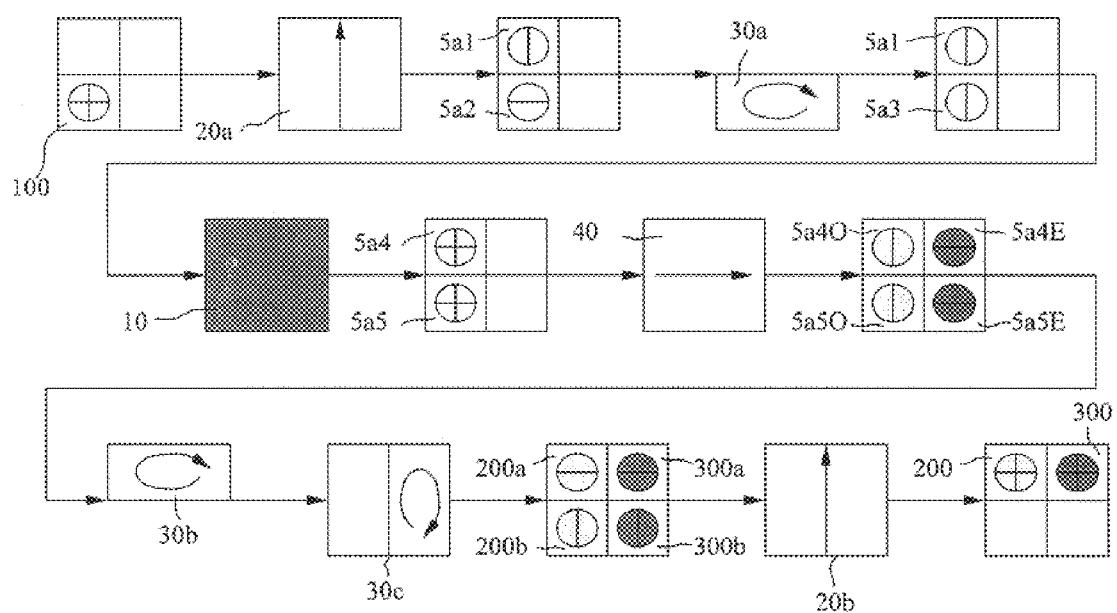
FIG. 5 is a schematic view of the polarization states along the optical path for separating waves in the first embodiment.
Figure 16B:
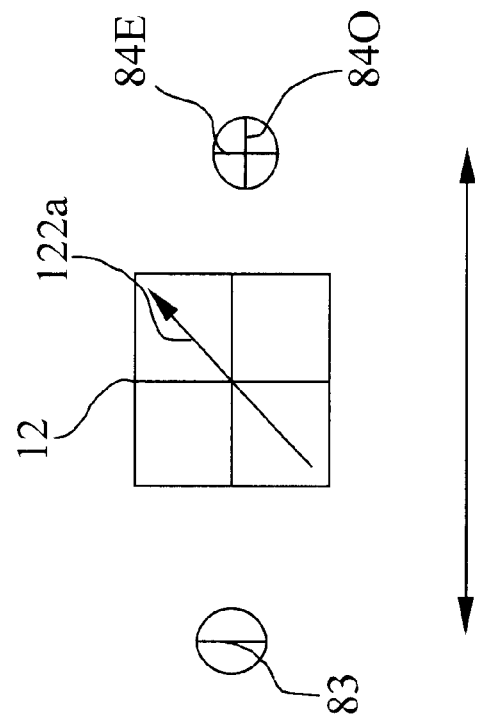
FIGS. 16A and 16B are schematic views showing the characters of the disclosed optical signal interleaving mechanism.
Figure 16A:
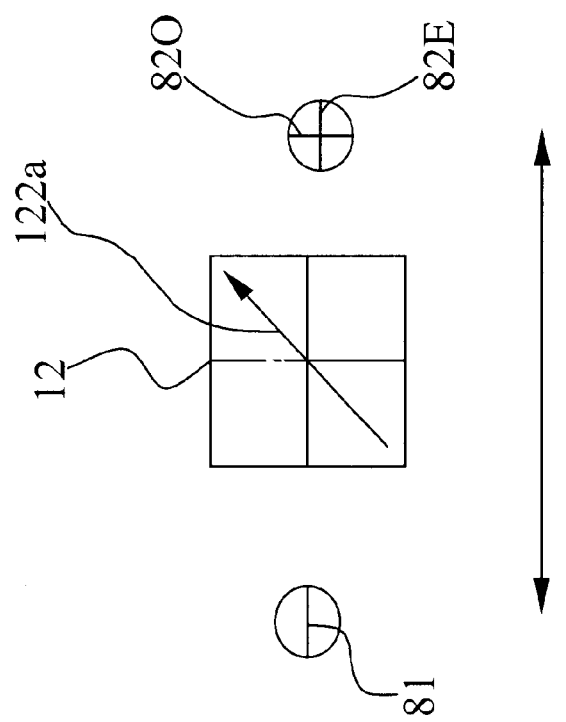

The polarization states along the optical path for separating waves are shown in FIG. 5. (The sizes of the polarization states in the drawing are drawn in accordance with the actual light signal interleaver structure. The same applies to the embodiments hereinafter.) The incident beam 100 first passes through the first polarization beam splitter/combiner 20a. Due to the walk-off effect of extraordinary polarized lights (E-ray), light signal 5a1 is spatially separated in the Y direction, forming two light signals 5a1, 5a2 with orthogonal polarizations. Afterwards, the lower light signal 5a2 is converted to an optical signal 5a3 with the same polarization as the upper light signal 5a1 by the first polarization rotator 30a. Both light signals are then sent to the optical signal interleaving mechanism 10. The optical signals generate a periodic spectrum due to phase delays among different wavelengths. The polarizations of the Odd-wavelengths beam ($\lambda_1$, $\lambda_3$ . . . ) and the Even-wavelengths beam ($\lambda_2$, $\lambda_4$ . . . ) are orthogonal to each other (FIGS. 16A and 16B to be explained later). The light signals 5a4, 5a5 are affected by the polarization beam displacer 40 so that the E-ray are split into optical signals 5a4O and 5a4E and the optical signal 5a5 into light signals 5a5O and 5a5E due to the walk-off effect. The beam angle deflector 50 then changes the propagation directions of the light signals 5a4O, 5a4E, 5a5O, 5a5E (FIG. 4A). (The purpose of having the beam angle deflector 50 is to change the propagation directions of the light signals so that they can enter the optical fiber collimator and therefore is not limited to be fixed at the position. It can be anywhere between the polarization beam displacer 40 and the optical fiber collimator. The same applies to the following embodiments.) After passing through the second polarization rotator 30b (rotating the light signals 5a4O, 5a4E by 90 degrees) and the third polarization rotator 30c (rotating the light signal 5a4E, 5a5E by 90 degrees), the second polarization beam splitter/combiner 20b combines the light signals 200a and 200b into an Odd-wavelength beam signal 200 and the light signals 300a and 300b into an Even-wavelength beam signal 300. These signals then couple into the two ports of a dual fiber collimator.

Figure 6:
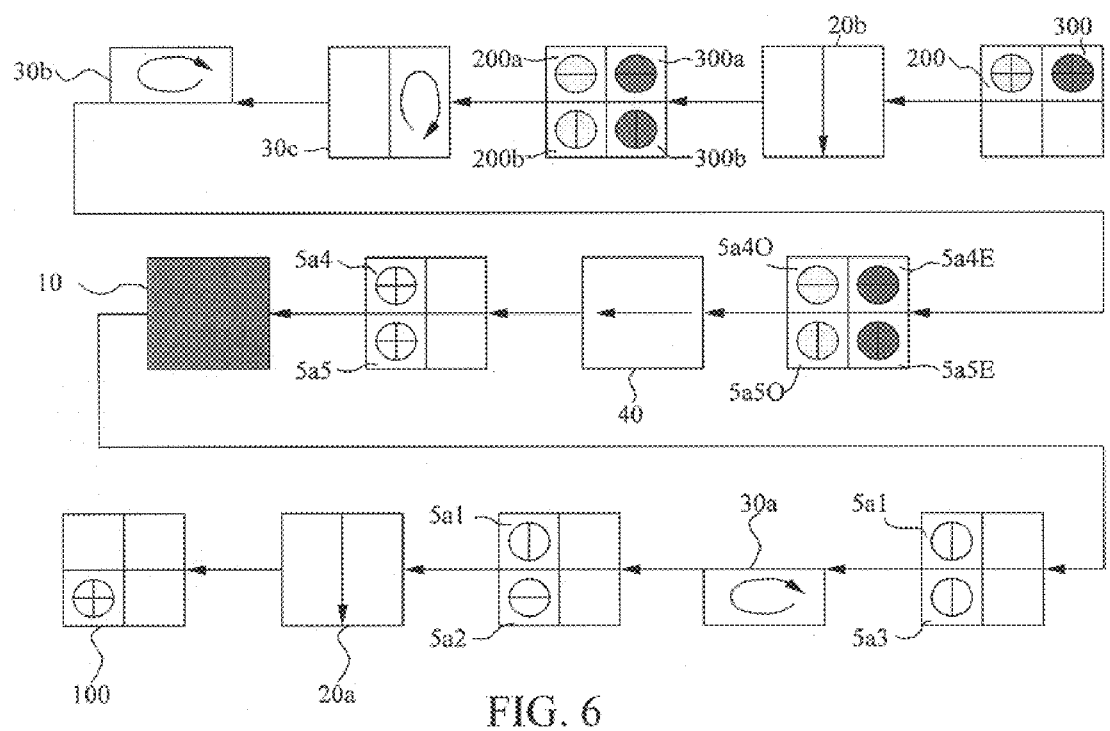
FIG. 6 is a schematic view of the polarization states along the optical path for combining waves in the first embodiment.

The polarization states along the optical path for combining waves are shown in FIG. 6. This is the opposite operation to separating waves mentioned above. The Odd-wavelengths beam 200 and the Even-wavelengths beam 300 are combined to form the incident beam 100 that contains light signals with all wavelengths. The polarization beam displacer 40 and the polarization beam splitter/combiner 20 can be a Faraday rotator or a half-wave plate. The beam angle deflector 50 can be optical glass or an optical crystal with a high refraction index.

The optical axis 122a of the optical signal interleaving mechanism 10 is shown in FIG. 16A. When an optical signal 81 (with all wavelengths and polarized in the X direction) enters, the interleaving mechanism 10 separates the optical signal 81 into an Odd-wavelength ray 82O (Y polarization) and an Even-wavelength ray 82E (X polarization). On the other hand, as shown in FIG. 16B, when a light signal 83 (with all wavelengths and polarized in the Y direction) enters, the interleaving mechanism 10 separates the light signal 83 into an Odd-wavelength ray 84O (X polarization) and an Even-wavelength ray 84E (Y polarization).

Figure 7A:
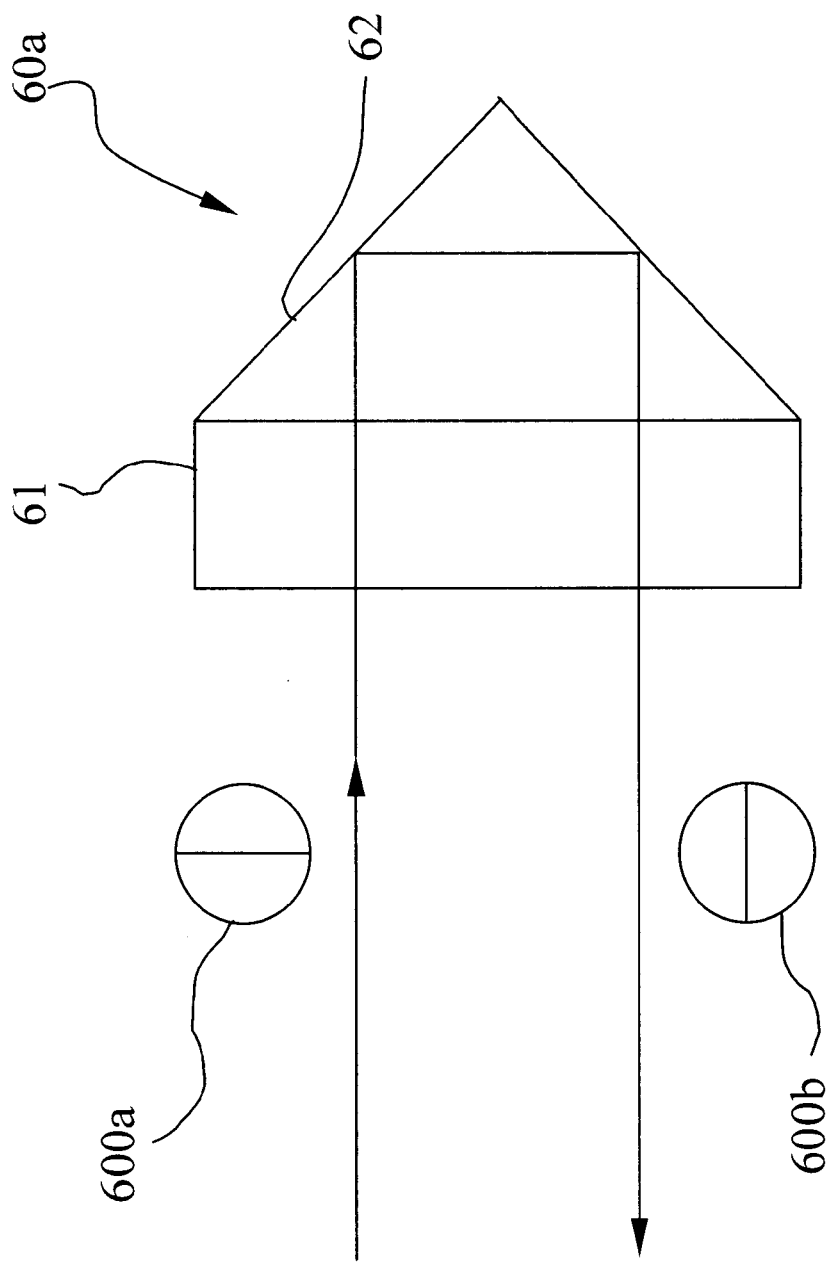
FIGS. 7A and 7B are schematic views of spatial displacement reflectors of the invention.
Figure 7B:
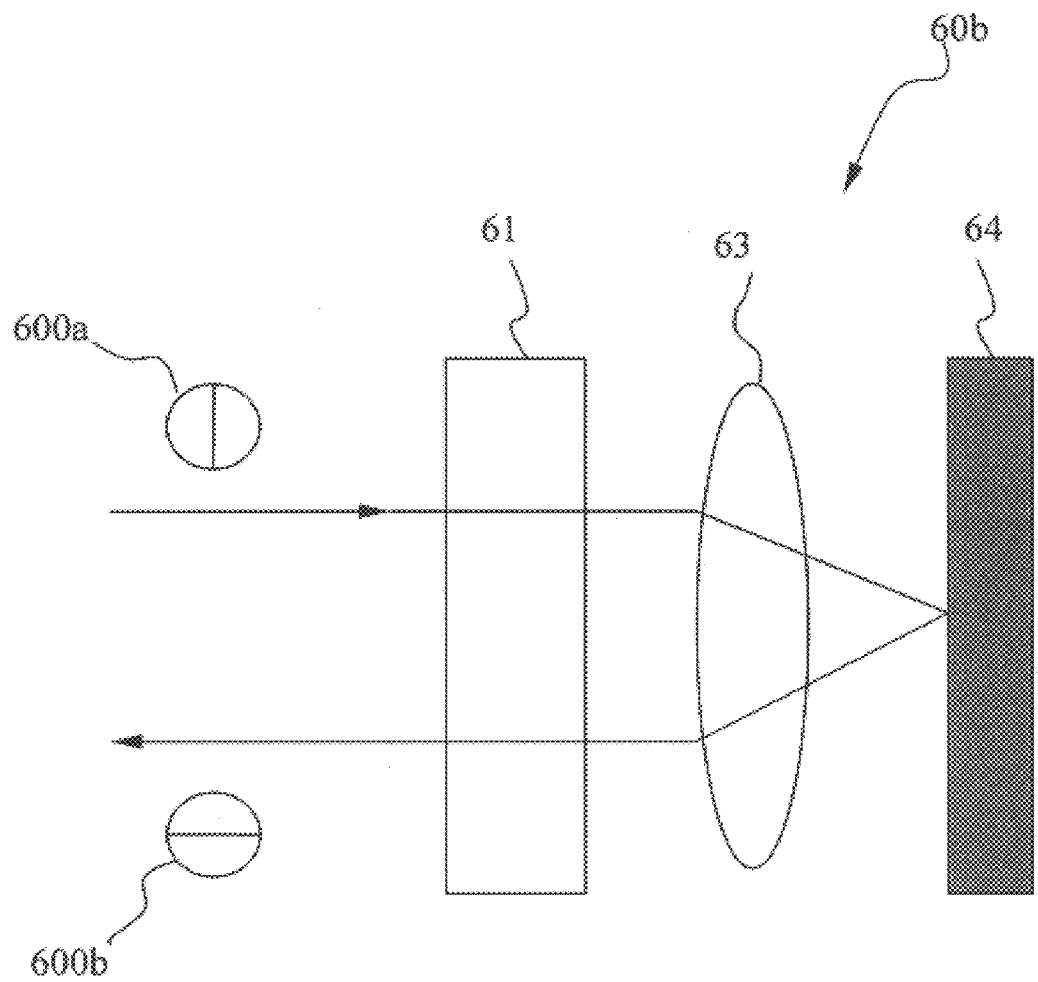

A second embodiment of the invention is a reflective optical signal interleaver shown in FIG. 7A. A spatial displacement reflector 60a includes a reciprocal polarization rotator 61a (e.g. a half-wave plate) and a dihedral retroreflector 62 to reflect the incident light signal 600a. The reflected light signal 600b travels in the opposite direction to the incident light signal 600a and their polarizations are orthogonal to each other. On the other hand, as shown in FIG. 7B, the spatial displacement reflector 60b with a non-reciprocal polarization rotator 61*b* (which can be a Faraday rotator or a quarter-wave plate), a convergent lens 63, and a highly reflective mirror 64 (disposed on the focal plane of the convergent lens 63) can achieve the same effects too.

The reflective optical signal interleaver (FIGS. 8A and 8B) includes beam angle deflectors 50*a*, 50*b*, a beam polarization splitter/combiner 20, a polarization rotator 30, a polarization beam displacer 40, a light signal interleaving mechanism 10 and a spatial displacement reflector 60 (which can be either 60*a* or 60*b*). The incident light 100 with all wavelengths ($\lambda_1, \lambda_2, \lambda_3, \lambda_4 \ldots$) is output from one port of a triple-core optical fiber collimator. After passing through the reflective light signal interleaver, the incident light 100 becomes an Odd-wavelength ray 200 and an Even-wavelength ray 300, which then enter the other two ports of the triple-core optical fiber collimator.

Figure 8A:
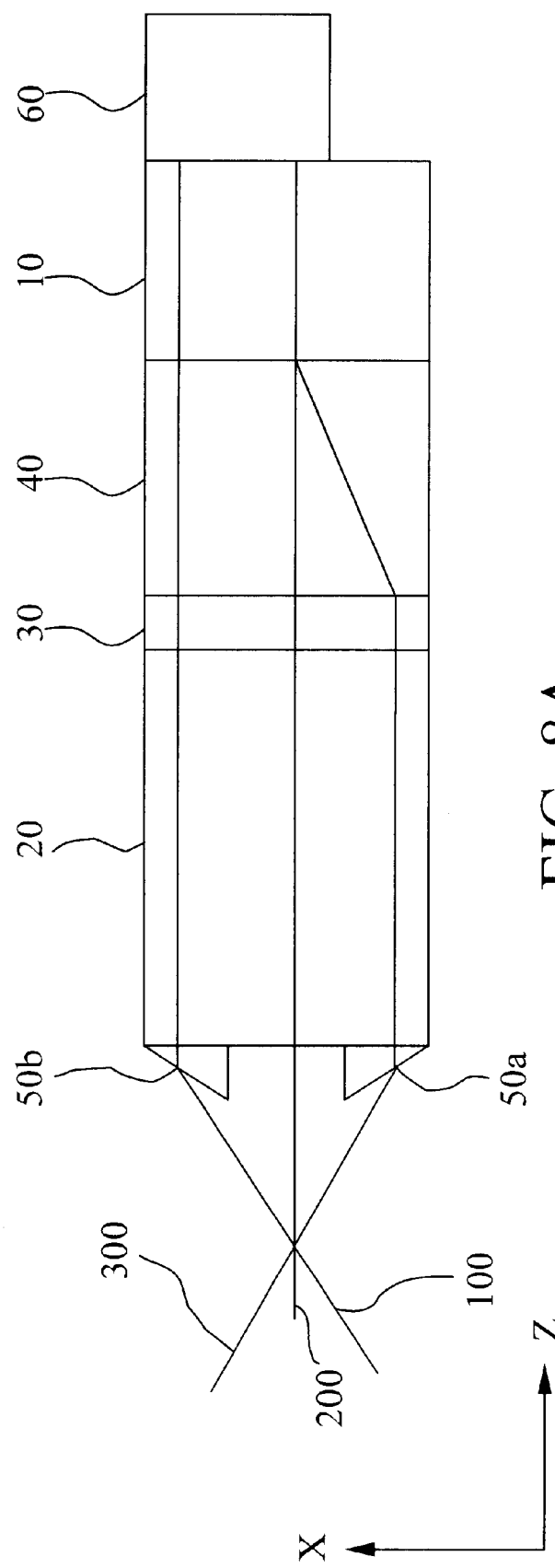
FIGS. 8A and 8B are schematic views of the structure and optical path in the second embodiment of the invention.
Figure 8B:
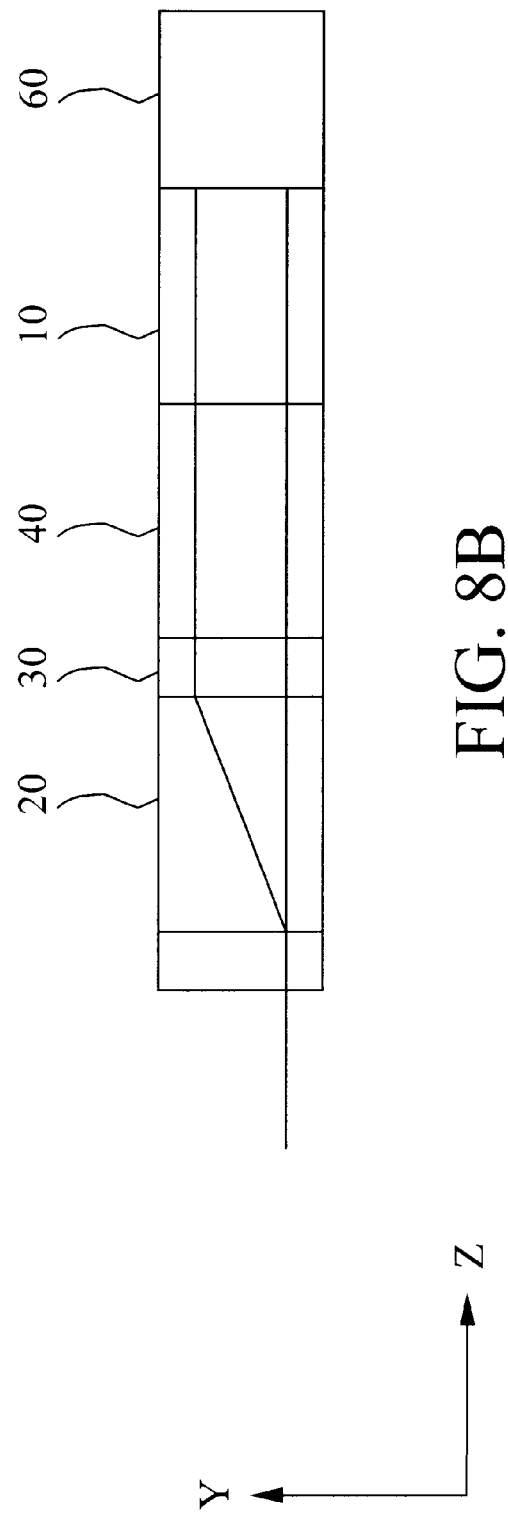
Figure 9:
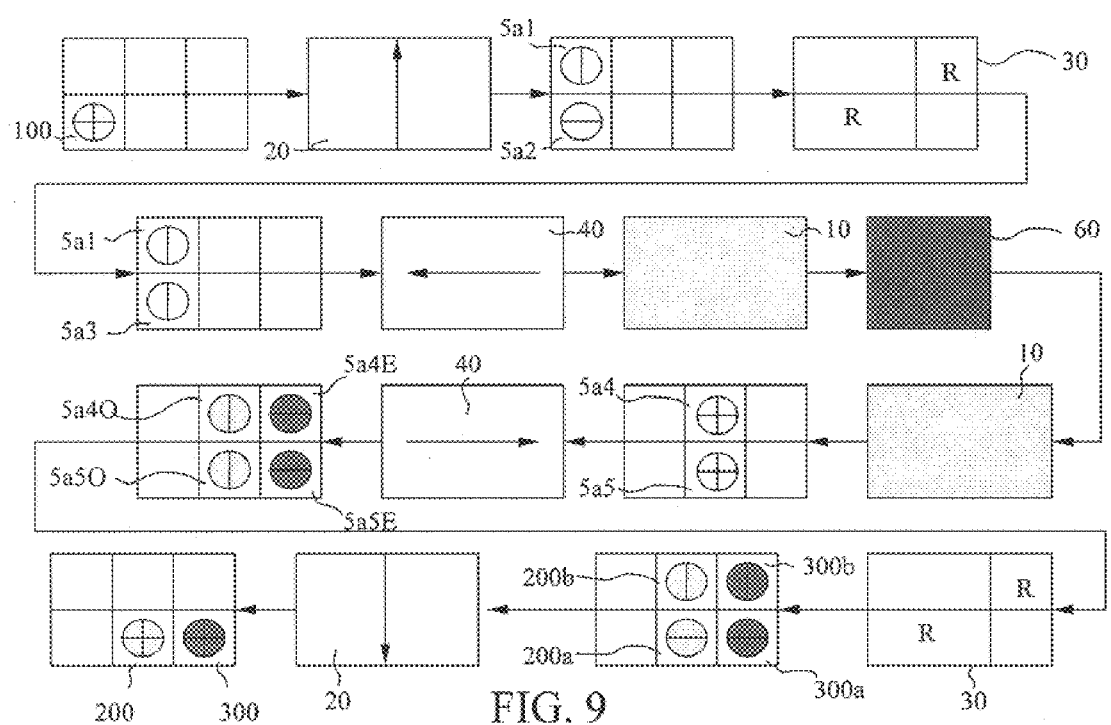
FIG. 9 is a schematic view of the polarization states along the optical path for separating waves in the second embodiment.

The polarization states along the optical path for separating waves are shown in FIG. 9. The incident light 100 first passes through the beam angle deflector 50*b*, gets deflected by an angle, and becomes orthogonal to the beam polarization splitter/combiner 20 (FIG. 8A). E-rays 5*a*1 comes out in the Y direction due to the walk-off effect. The lower optical signal 5*a*2 is affected by the polarization rotator 30 to form an optical signal 5*a*3 with the same polarization as the upper light signal 5*a*1. (The effective influence range of the polarization rotator 30 is marked by "R" and therefore the light signal 5*a*1 is unaffected.) After passing through the polarization beam displacer 40 (the beams are not affected because the polarization is orthogonal to the action direction of the polarization beam displacer 40), the light signals 5*a*1, 5*a*3 enter the light signal interleaving mechanism 10 together. The optical signals passing through the light signal interleaving mechanism 10 generate a periodic spectrum due to phase delays for different wavelengths. The polarizations of the Odd-ray ($\lambda_1, \lambda_3 \ldots$) and the Even-ray ($\lambda_2, \lambda_4 \ldots$) are orthogonal to each other. The optical signals are then reflected by the spatial displacement reflector 60. Therefore, their polarizations are rotated by 90 degrees and the signals have spatial displacements. The reflected beams pass through the light signal interleaving mechanism 10 again. They keep interfering with each other until a desired channel spacing is obtained, giving two optical signals 5*a*4, 5*a*5. Optical signals 5*a*4, 5*a*5 are affected by the polarization beam displacer 40 so that the E-rays (in this embodiment also the Even wavelengths signals) are separated due to the walk-off effect. (The E-ray is deviated to the left when it enters; therefore, it deviates to the right after being reflected.) The light signal 5*a*4 is then separated into light signals 5*a*4O, 5*a*4E, and the light signal 5*a*5 into light signals 5*a*5O, 5*a*5E. Afterwards, they pass through the polarization rotator 30 (the polarizations of the light signals 5*a*5O, 5*a*4E are rotated by 90 degrees). The polarization beam splitter/combiner 20 recombines the light signals 200*a*, 200*b* into an Odd-wavelength ray 200, the light signals 300*a*, 300*b* into an Even-wavelength ray 300. The Even-wavelength ray changes its propagation direction after passing through the beam angle deflector 50*a* (FIG. 8A). The Odd-wavelength ray 200 and the Even-wavelength ray 300 finally enter the other two ports of the triple-core optical fiber collimator.

Figure 10:
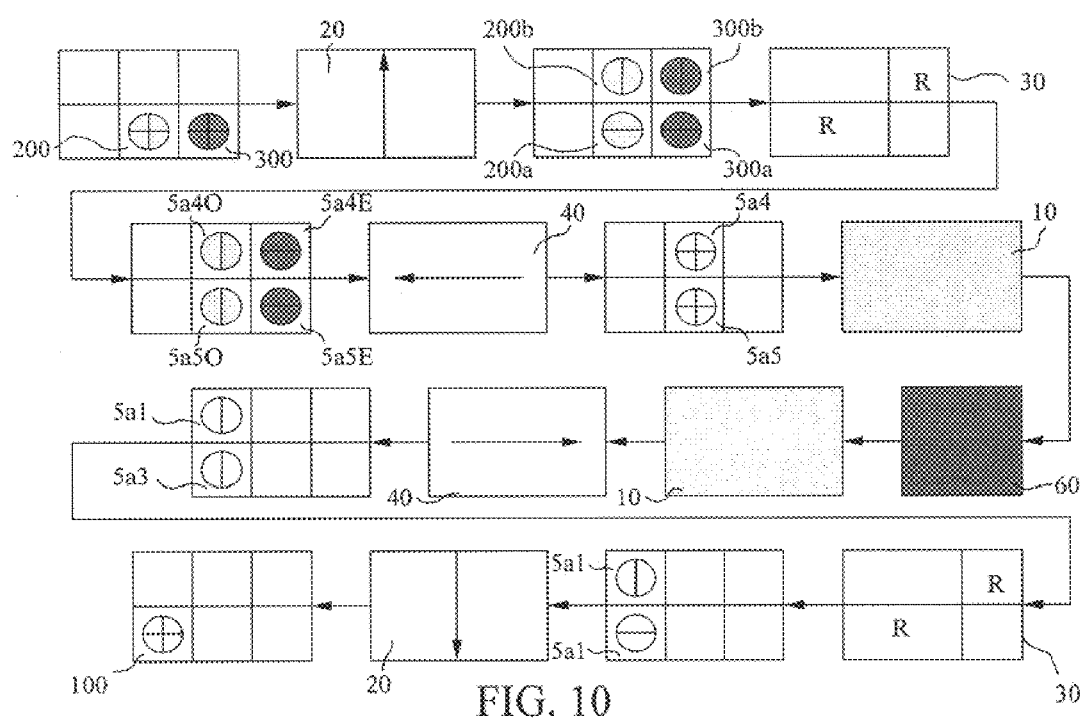
FIG. 10 is a schematic view of the polarization states along the optical path for combining waves in the second embodiment.

The polarization states along the optical path for combining waves are shown in FIG. 10. This is the opposite operation to separating waves mentioned above. The Odd-wavelength ray 200 and the Even-wavelength ray 300 emitted from the two ports of the triple-core optical fiber collimator are combined to form an incident beam 100 containing all wavelengths ($\lambda_1, \lambda_2, \lambda_3, \lambda_4 \ldots$), after being reflected by the reflective optical signal interleaver. The combined beam enters the other port of the triple optical fiber collimator.

Figure 11:
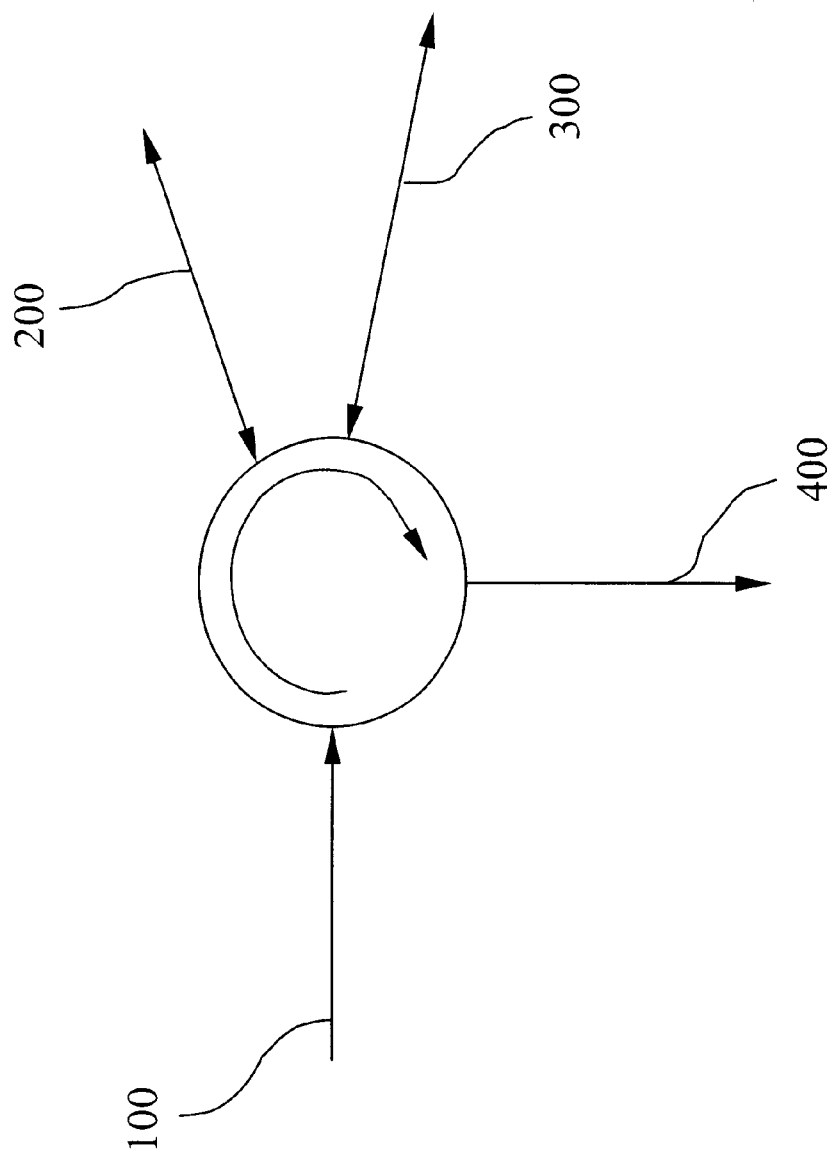
FIG. 11 is a schematic view showing the four-port optical signal circulating interleaver of the invention.

The third and fourth embodiments of the invention use the principle of optical circulators. Referring to FIG. 11 for a four-port light signal interleaving circulator. The incident light 100 enters at channel spacing of f. The circulator then outputs an Odd-wavelength ray 200 and an Even-wavelength ray with channel spacings of 2f, respectively. If the Odd-wavelength and the Even-wavelength rays are incident from 200 and 300 respectively, then the interleaved wavelength beams are output from the circulator's port 400. Therefore, the circulator has the functions of separating/combining waves. The circulating direction of the light signal is the same for optical signals of all wavelengths.

Figure 12A:
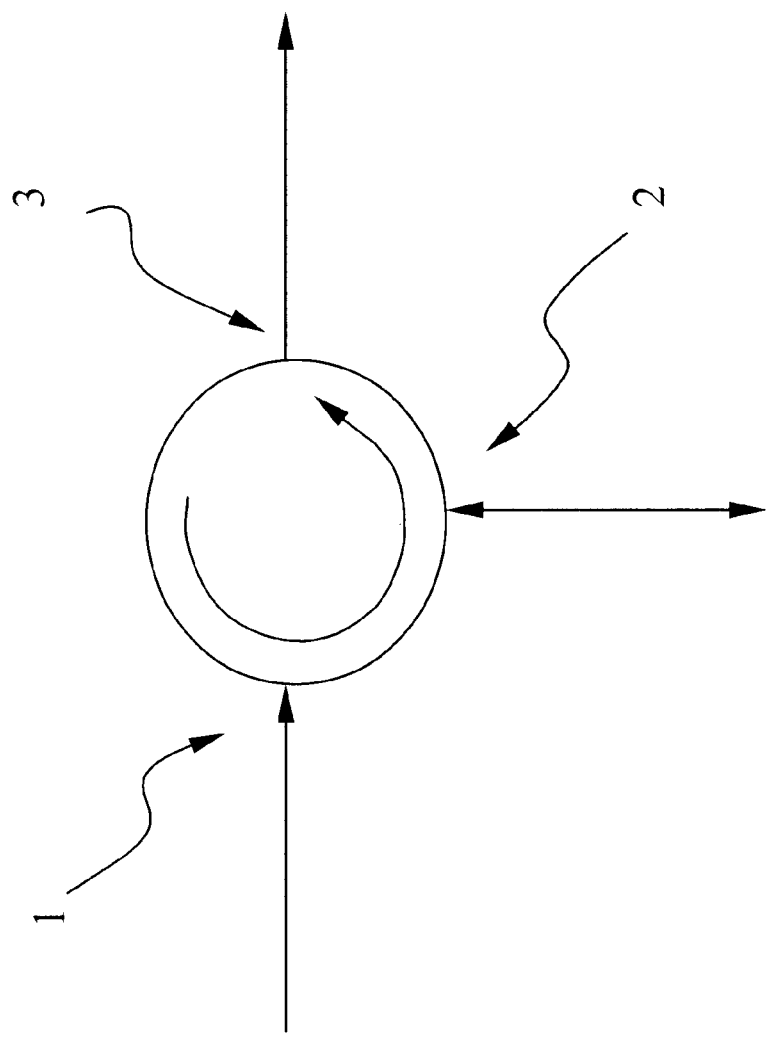
FIGS. 12A and 12B are schematic view showing the three-port optical signal bi-circulating interleaver of the invention.
Figure 12B:
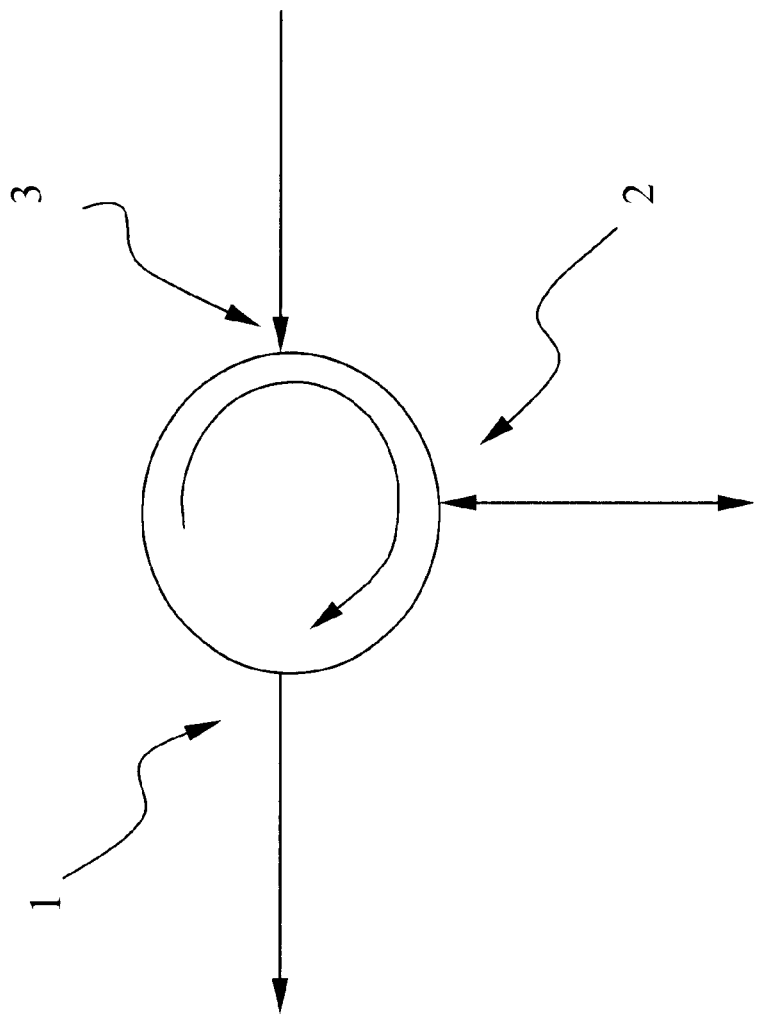

As shown in FIGS. 12A and 12B, the circulating direction in a three-port optical signal bi-circulator depends upon the wavelength. In FIG. 12A, suppose an Odd-wavelength ray enters the first port 1, it comes out from the second port 2. The Odd-wavelength beam entering the second port 2 comes out from the third port 3. On the other hand, in FIG. 12B, an Even-Odd-wavelength ray entering the third port 3 comes out from the second port 2 and the Even-Odd-wavelength ray entering the second port 2 comes out from the first port 1. Therefore, this device acts as an optical interleaver when Odd-wavelengths signals enter port 1 and Even-wavelength signals enter from port 3, with combined signals emitting from port 2.

Figure 13A:
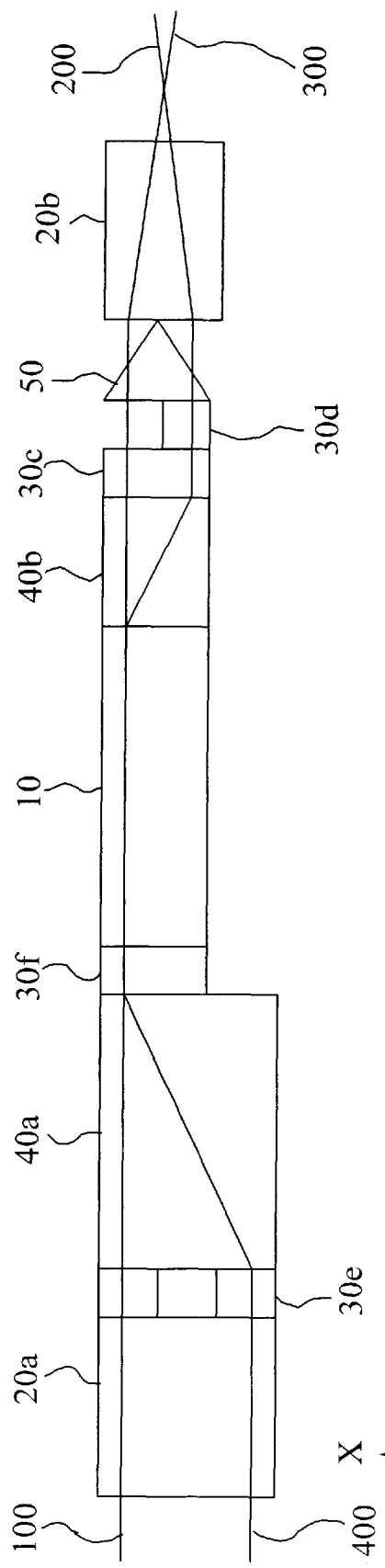
FIGS. 13A and 13B are schematic views of the structure and the optical path in the third embodiment.
Figure 13B:
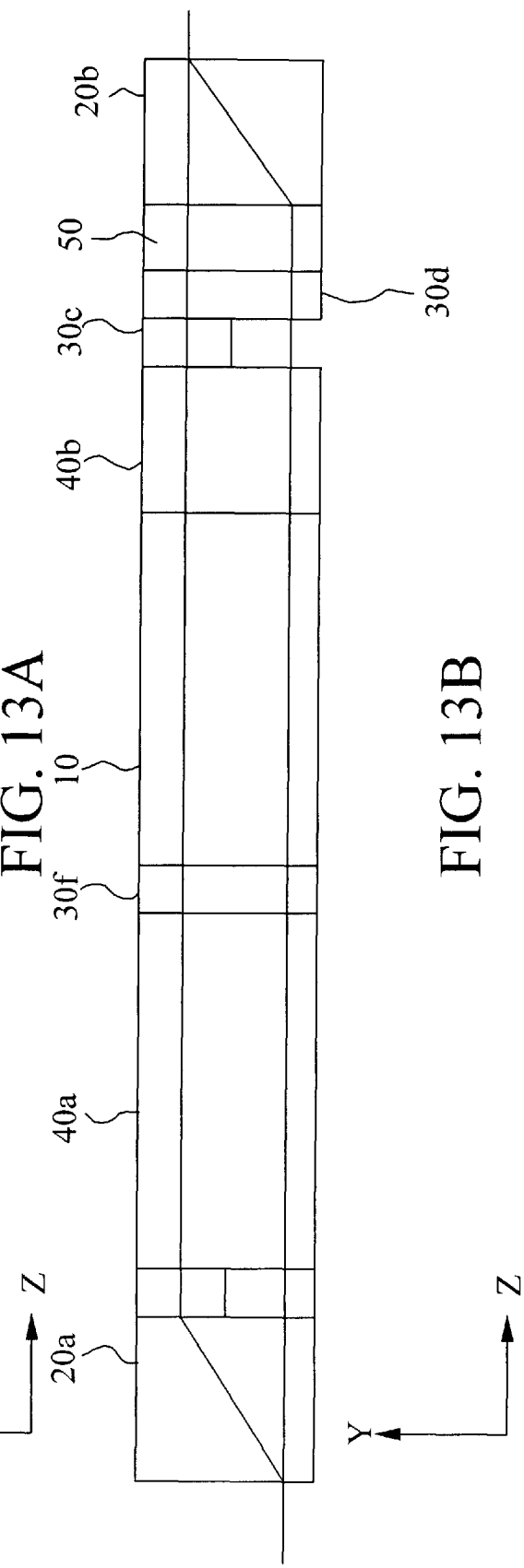

Referring to FIGS. 13A and 13B for the third embodiment, which is a four-port optical signal interleaving circulator. It contains a first polarization beam splitter/combiner 20*a*, a first polarization rotator set 30*e*, a first polarization beam displacer 40*a*, a second polarization rotator set 30*f*, a light signal interleaving mechanism 10, a second polarization beam displacer 40*b*, a third polarization rotator 30*c*, a fourth polarization rotator 30*d*, a beam angle deflector 50 and a second polarization beam splitter/combiner 20*b*. Their functions are the same as the ones described before (FIG. 11) and are not repeated here again. The polarization beam displacers and the polarization beam splitters/combiners can use a birefringent crystal. The beam angle deflector 50 can be optical glass or an optical crystal with a high refraction index (the same applies to the fourth embodiment).

Figure 14:
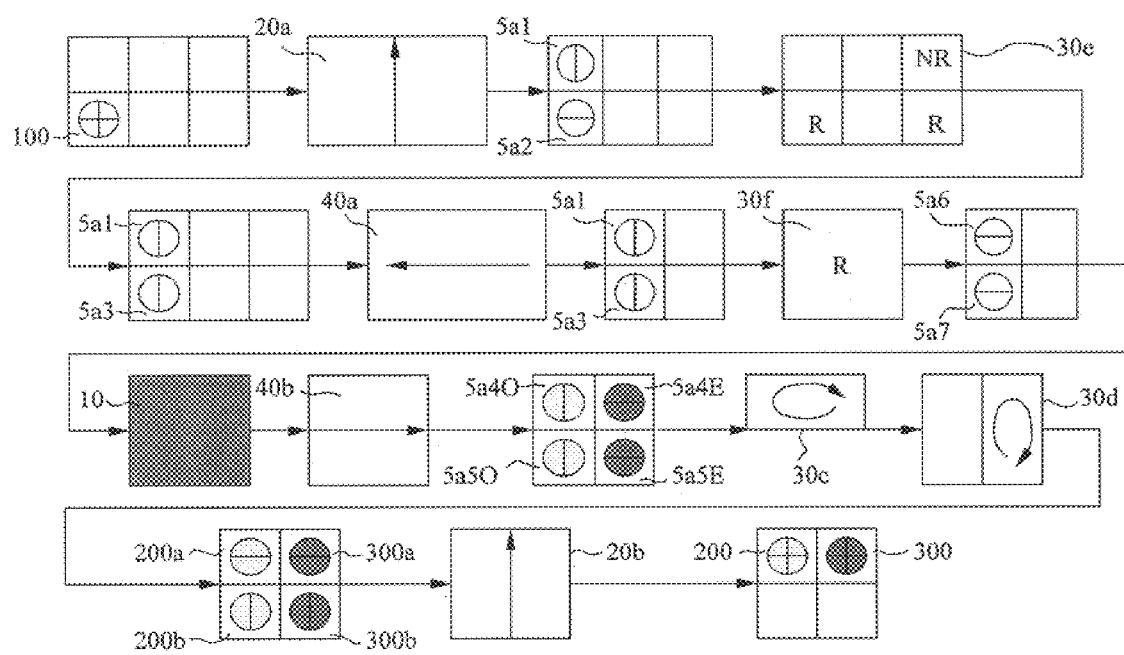
FIG. 14 is a schematic view of the polarization states along the optical path for separating waves in the third embodiment.

The polarization states along the optical path for separating waves in the third embodiment are shown in FIG. 14. The incident light 100 with all wavelengths ($\lambda_1, \lambda_2, \lambda_3, \lambda_4 \ldots$) is output from a single optical fiber collimator. After passing through the first polarization beam splitter/combiner 20*a*, a light signal 5*a*1 is extracted in the Y direction due to the walk-off effect, forming two light signals 5*a*1, 5*a*2 with orthogonal polarizations. Optical signal 5*a*2 is affected by the first polarization rotator set 30*e* to form an optical signal 5*a*3 with the same polarization as optical signal 5*a*1. The areas in the polarization rotator set 30*e* marked by "R" mean active locations that can rotate the polarizations of the beams by 90 degrees. The one marked by "NR" are inactive locations for the forward passing direction. When the beams are reversed, due to the irreversibility of light, the "R" areas become "NR" and vice versa. This non-reciprocal effect is implemented by using a half-wave plate (or a quarter-wave plate) and a Faraday rotator in series.

The beams then enter the polarization beam displacer 40*a*. Since both of them are ordinary rays (O-rays), they are not affected by the displacer 40*a* and enter the second polarization rotator 30f. The polarizations of the light signals 5a1, 5a3 are rotated by 90 degrees and become the light signals 5a6 and 5a7. They both enter the light signal interleaving mechanism 10. The light signals generate a periodic spectrum due to the phase delays of different wavelengths, and the Odd-wavelength ray ($\lambda_1$, $\lambda_3$ . . . ) and Even-wavelength ray ($\lambda_2$, $\lambda_4$ . . . ) are orthogonal to each other. Due to the influence of the polarization beam displacer 40b, the E-ray signal experiences the walk-off effect and gets separated, forming light signals 5a4O, 5a4E, 5a5O, 5a5E. Afterwards, they pass through the third polarization rotator 30c, the fourth polarization rotator 30d, becoming light signals 200a, 200b, 300a, 300b. Finally, the second polarization beam splitter/combiner 20b combines the optical signals 200a, 200b into an Odd-wavelength ray 200 and the optical signals 300a, 300b into an Even-wavelength ray 300. Both of the beams are then directed into two ports of a dual optical fiber collimator.

Figure 15:
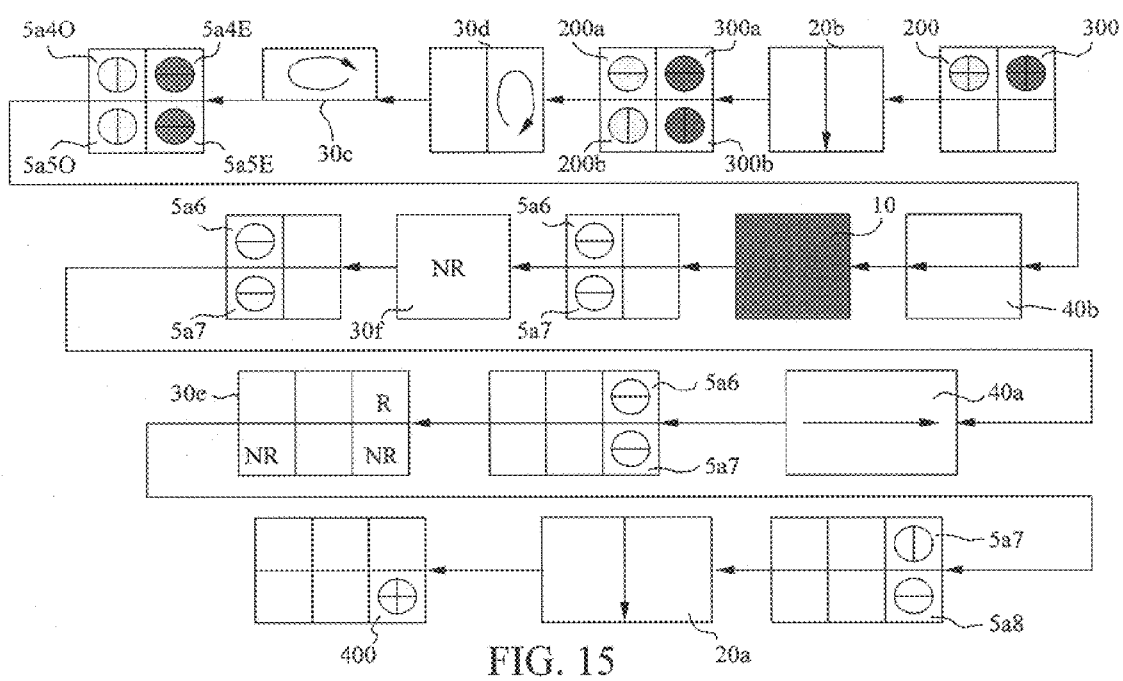
FIG. 15 is a schematic view of the polarization states along the optical path for combining waves in the third embodiment.

Analogously, the polarization states along the optical path for combining waves are shown in FIG. 15. The Odd-wavelength ray 200 and the Even-wavelength ray 300 enter the second polarization beam splitter/combiner 20b to separate the O-ray 200 and the E-ray 300 into light signals 200a, 200b, 300a, 300b. After passing through the fourth polarization rotator 30d and the third polarization rotator 30c in series, the polarizations are rotated to form light signals 5a4O, 5a4E, 5a5O, 5a5E. Afterwards, the beams pass through the polarization beam displacer 40b (since the traveling direction is opposite to that when separating waves, the displacement is also reversed) and the light signal interleaving mechanism 10. Two light signals 5a6, 5a7 with the same polarizations are formed. They then pass through the second polarization rotator set 30f without being affected (due to non-reciprocal polarization rotation effect), enter the polarization beam displacer 40a and get shifted to the right. Through the first polarization rotator set 30e, the polarization of the upper light signal 5a6 is rotated by 90 degrees and becomes a light signal 5a8. Finally, the first polarization beam splitter/combiner 20a combines both light signals to form an combined outgoing beam 400 emitted from a position different from the incident light 100.

Figure 17A:
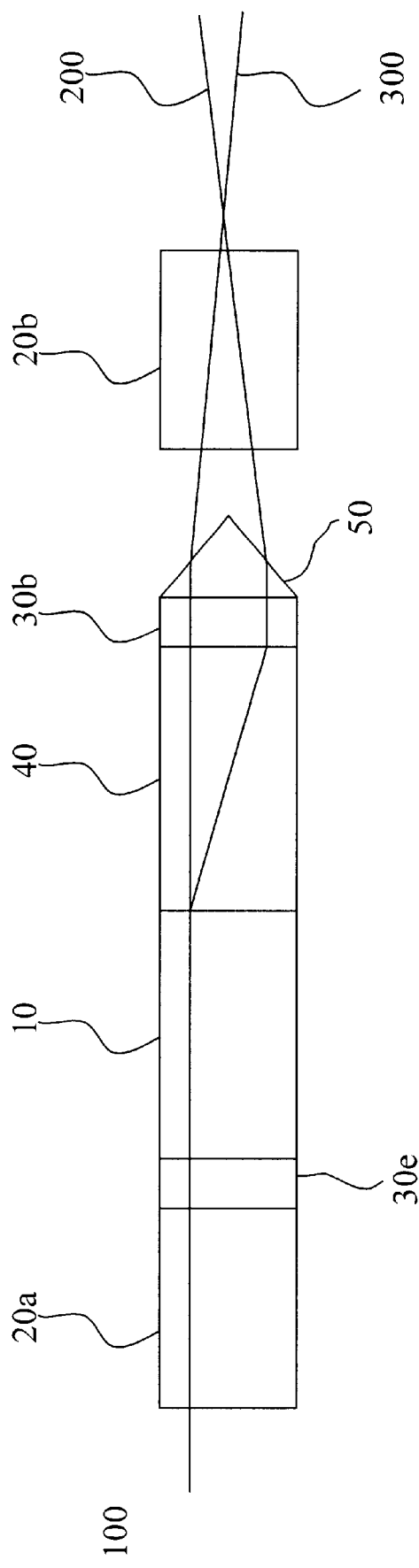
FIGS. 17A and 17B are schematic views of the structure and the optical path in the fourth embodiment.
Figure 17B:
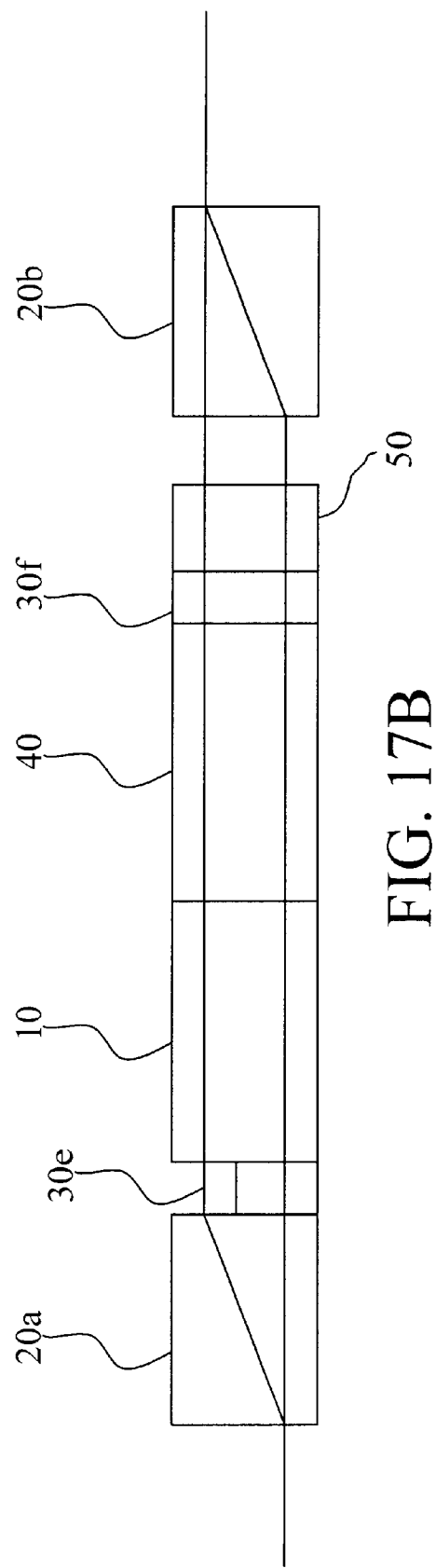

With reference to FIGS. 17A and 17B, the fourth embodiment of the invention has the characters of a three-port bi-circulator. It contains a first polarization beam splitter/combiner 20a, a first polarization rotator set 30e, an optical signal interleaving mechanism 10, a polarization beam displacer 40, a second polarization rotator set 30b, a beam angle deflector 50, and a second polarization beam splitter/combiner 20b. The functions of these components are the same as before and are not repeated here again.

Figure 18:
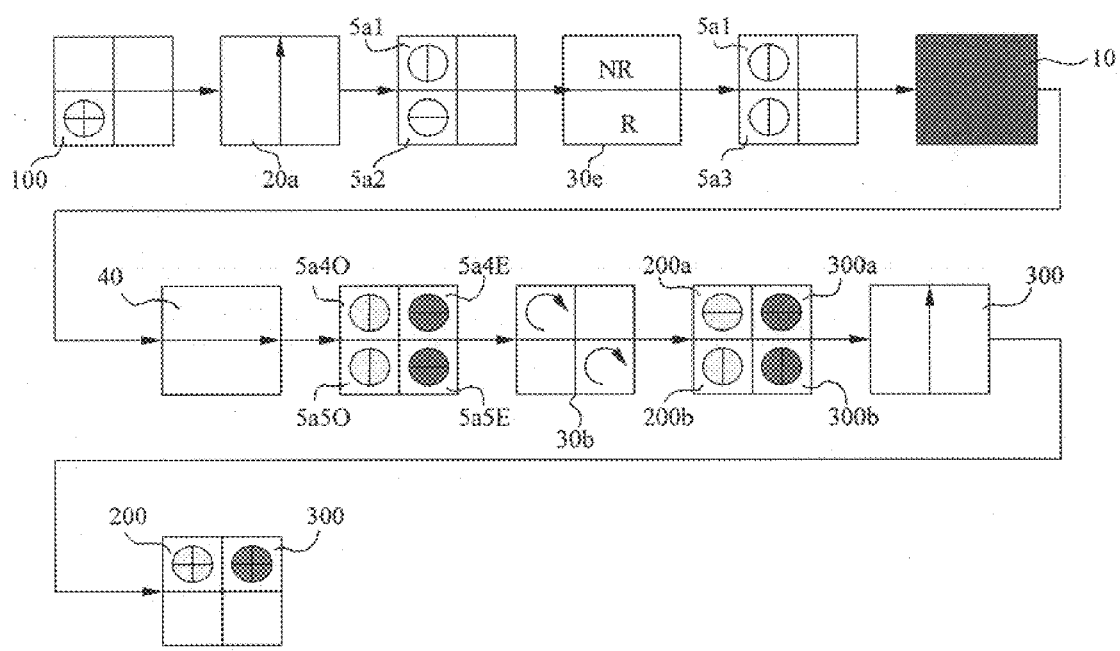
FIG. 18 is a schematic view of the first example of the polarization states along the optical path for separating waves in the fourth embodiment.

A first example of the polarization states along the optical path for separating waves in the fourth embodiment is shown in FIG. 18. The incident light 100 with all wavelengths ($\lambda_1$, $\lambda_2$, $\lambda_3$, $\lambda_4$ . . . ) is output from a single optical fiber collimator. After passing through the first polarization beam splitter/combiner 20a, an optical signal 5a1 is extracted in the Y direction due to the walk-off effect, forming two optical signals 5a1, 5a2 with orthogonal polarizations. Beam 5a2 is affected by the first polarization rotator set 30e to form 5a3 with the same polarization as the upper light signal 5a1. The areas in the polarization rotators 30e marked by "R" mean active rotation locations that can rotate the polarizations of the beams by 90 degrees. The one marked by "NR" are inactive locations. When the beams are traversing in the reversed direction, the "R" areas become "NR" and vice versa. This non-reciprocal effect is achieved by using a half-wave plate (or a quarter-wave plate) and a Faraday rotator in series.

The beams then enter the light signal interleaving mechanism 10 and the polarization beam displacer 40, forming light signals 5a4O, 5a4E, 5a5O, 5a5E. Afterwards, they pass through the second polarization rotator 30b, becoming light signals 200a, 200b, 300a, 300b. Finally, the second polarization beam splitter/combiner 20b combines the light signals 200a, 200b into an Odd-wavelength ray 200 and the light signals 300a, 300b into an Even-wavelength ray 300. Both of the beams are then directed into two ports of a dual optical fiber collimator.

Figure 19:
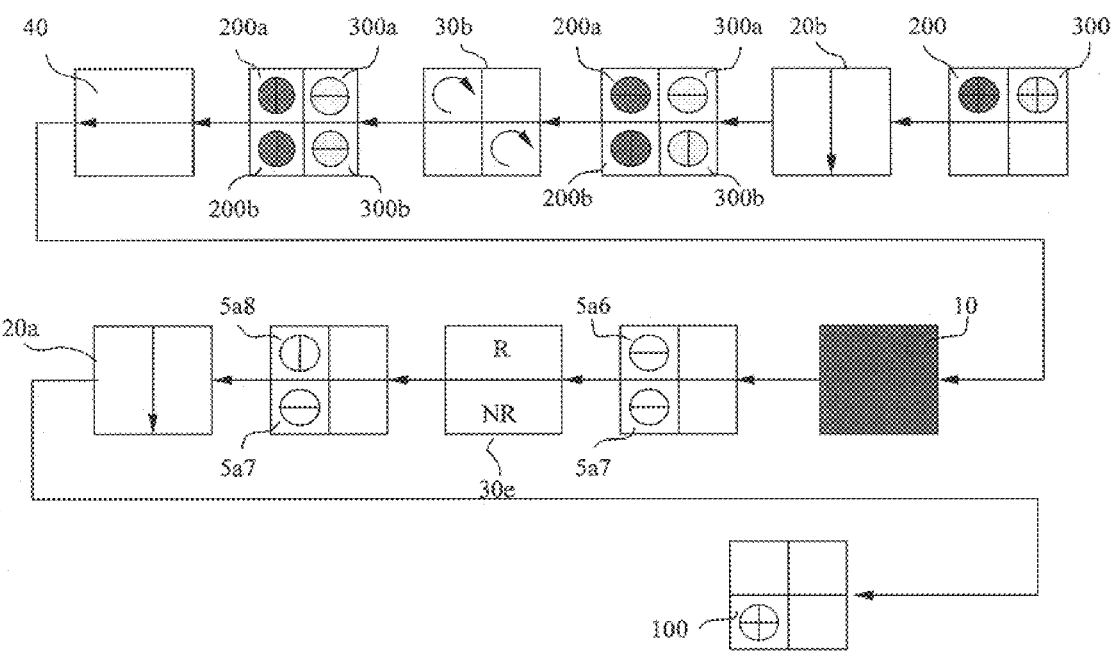
FIG. 19 is a schematic view of the first example of the polarization states along the optical path for combining waves in the fourth embodiment.

Analogously, a first example of the polarization states along the optical path for combining waves in the fourth embodiment is shown in FIG. 19. However, the Odd-wavelength ray signal and the Even-wavelength ray signal have to be interchanged (the Even-wavelength ray now enters from port 200 and Odd-wavelength ray enters from por 300), so the signals entering the optical signal interleaving mechanism 10 are orthogonal to those coming out of the light signal interleaving mechanism 10 for separating waves. (Please compare the positions of the light signals 5a4O, 5a4E, 5a5O, 5a5E after the polarization beam displacer 40 in FIG. 18 and the light signals 5a4O, 5a4E, 5a5O, 5a5E before the polarization beam displacer 40 in FIG. 19.) Therefore, the polarization states of the light signals 5a6, 5a7 passing through the light signal interleaving mechanism 10 are orthogonal to those of the light signals 5a1, 5a3 before entering the light signal interleaving mechanism 10 for separating waves. An incident beam 100 with all wavelengths can thus be obtained.

Figure 20:
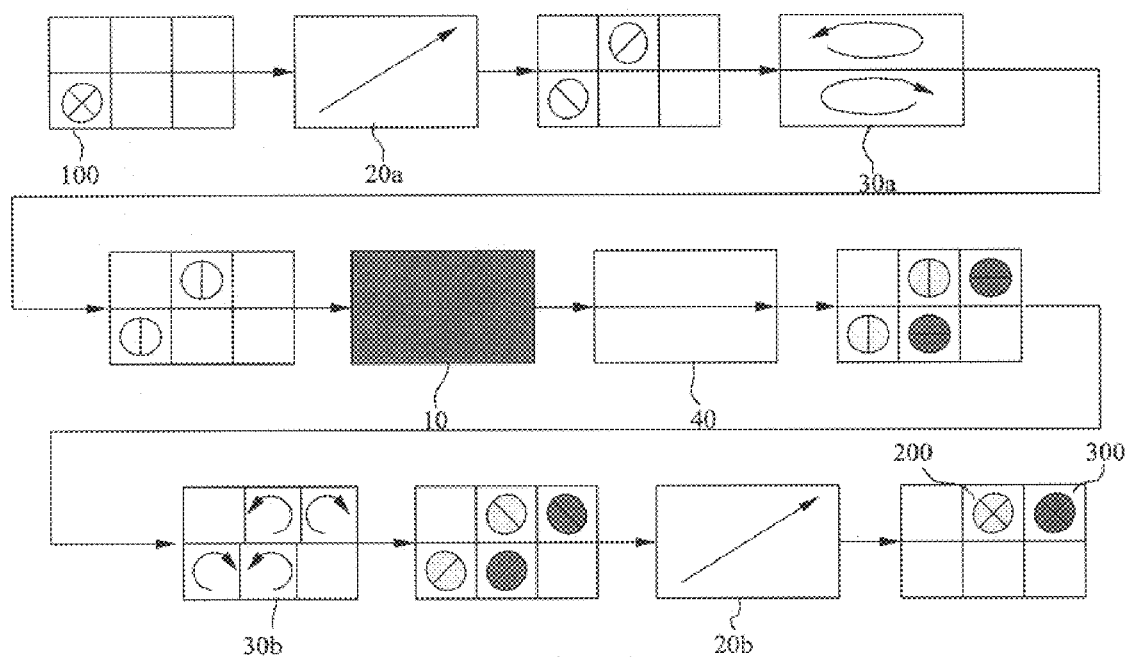
FIG. 20 is a schematic view of the second example of the polarization states along the optical path for separating waves in the fourth embodiment.
Figure 21:
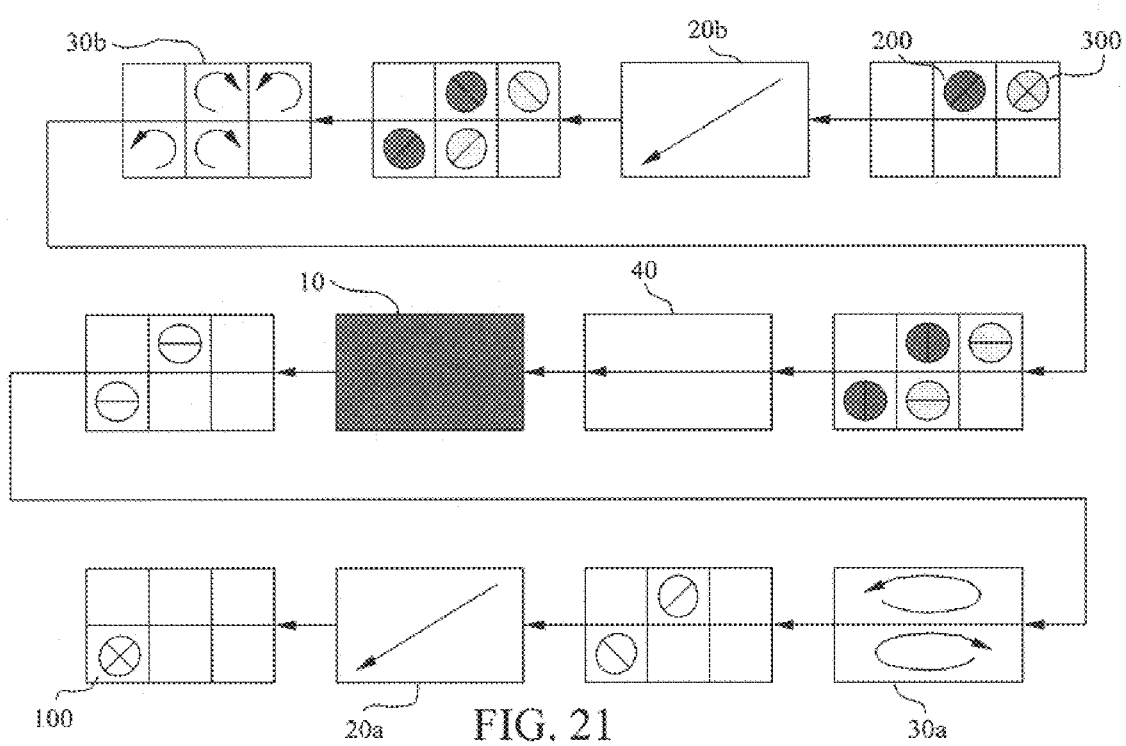
FIG. 21 is a schematic view of the second example of the polarization states along the optical path for combining waves in the fourth embodiment.

A second example of the fourth embodiment is shown in FIGS. 20 and 21. The basic principles are the same as the first example. However, a first polarization rotator 30a replaces the first polarization rotator set 30e (using only a Faraday rotator to produce nonreciprocal polarization rotations). The second polarization rotator set 30b only uses half-wave plates, so it is optically reciprocal. The displacement direction of the first polarization beam splitter/combiner 20a and the second polarization beam splitter/combiner 20b is 45 degrees. The polarization directions of the first polarization rotator 30a and the second polarization rotator 30b also change accordingly. The rest are the same as the previous example. The angle of the incident beam 100 depicted in the drawing is different from the previous one. It is simply because the polarization state is random. It is used to show that the beam is displaced toward one direction and its polarization state rotates, not an incident beam with a different polarization. So the rest is not repeated here again.

Effects of the Invention

The invention pertains to an optical signal interleaver, which uses several birefringent plates to form a light signal interleaving mechanism. It can combine light signals with all wavelengths into an Even-wavelength ray and an Odd-wavelength ray. Therefore, the interval becomes smaller. With the combination of the polarization beam splitter/combiner, the polarization rotator, the polarization beam displacer, and the beam angle deflector, the light signal interleaver can separate an incident light output from an optical fiber collimator (with all wavelengths) into an Odd-wavelength ray and an Even-wavelength ray. Both of the beams are then directed to enter two ports of a dual optical fiber collimator, implementing the goal of increasing the total transmission capacity under the current network structure.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical signal interleaver to separate an incident beam with all wavelengths into an Even-wavelength ray and an Odd-wavelength ray for output, which comprises:

a first polarization beam splitter/combiner, which splits the incident beam into two separate beams with orthogonal polarizations;

a first polarization rotator, which rotates the polarization of one of the separate beams so as to get two beams with the same polarization;

an optical signal interleaving mechanism, which interleaves the two beams with the same polarization to form two light signals, each having the Even-wavelength ray and the Odd-wavelength ray orthogonal in their polarizations;

a polarization beam displacer, which displaces and separates each of the two light signals with the Even-wavelength ray and the Odd-wavelength ray orthogonal in their polarizations into an E-polarized signal and an O-polarized signal;

a second polarization rotator, which rotates the polarizations of one of the Even-wavelength ray signals and the adjacent Odd-wavelength ray signals to be orthogonal to those of the other Even-wavelength ray signal and the other Odd-wavelength ray signal;

a third polarization rotator, which rotates the polarizations of the two Even-wavelength ray signals or the two Odd-wavelength ray signals to be orthogonal to their original type;

a second polarization beam splitter/combiner, which combines the Even-wavelength ray signals with orthogonal polarizations and the Odd-wavelength ray signals with orthogonal polarizations into the Even-wavelength ray and the Odd-wavelength ray, respectively, for output; and a beam angle deflector, which is disposed between the polarization beam displacer and the output position of the Even-wavelength ray and the Odd-wavelength ray to deflect the traveling direction of the optical signals passing through so that the Even-wavelength ray and the Odd-wavelength ray can enter a double optical fiber collimator.

2. The optical signal interleaver of claim 1, wherein the first polarization beam splitter/combiner and the second polarization beam splitter/combiner are birefringent crystals.

3. The optical signal interleaver of claim 1, wherein the first polarization rotator and the second polarization rotator are Faraday rotators.

4. The optical signal interleaver of claim 1, wherein the first polarization rotator and the second polarization rotator are half-wave plates.

5. The optical signal interleaver of claim 1, wherein the beam angle deflector is optical glass.

6. The optical signal interleaver of claim 1, wherein the beam angle deflector is an optical crystal with a high refraction index.

7. The optical signal interleaver of claim 1, wherein the optical signal interleaving mechanism comprises a pair of birefringent plates, one of the birefringent plates generating an interleaving effect and the other stabilizing temperature.

8. The optical signal interleaver of claim 1 further comprising a second polarization beam displacer and a second polarization rotator, wherein the second polarization beam displacer and the second polarization rotator are disposed in order between the first polarization rotator and the optical signal interleaving mechanism so that, with the first polarization rotator being a non-reciprocal polarization rotator, the position of the outgoing beam with all wavelengths by combining the E-ray and the O-ray is different from that of the incident beam.

9. The optical signal interleaver of claim 1, wherein the first polarization rotator is a non-reciprocal polarization rotator so that, when the input positions of the Even-wavelength ray and the Odd-wavelength ray are interchanged for combining waves, a beam with all wavelengths can be produced after the Even-wavelength ray and the Odd-wavelength ray pass through the optical signal interleaver.

10. The optical signal interleaver of claim 9, wherein the first polarization rotator is composed of a Faraday rotator and a half-wave plate.

11. The optical signal interleaver of claim 9, wherein the first polarization rotator is composed of a half-wave plate and a quarter-wave plate.

12. The optical signal interleaver of claim 1, wherein the first polarization rotator and the second polarization rotator have a displacement direction of 45 degree so that, when the input positions of the Even-wavelength ray and the Odd-wavelength ray are interchanged for combining waves, a beam with all wavelengths can be produced after the Even-wavelength ray and the Odd-wavelength ray pass through the optical signal interleaver.

13. An optical signal interleaver for connecting to a triple-core optical fiber collimator whose one port generates an incident beam with all wavelengths that is reflected after passing through the optical signal interleaver and becomes an Even-wavelength ray and an Odd-wavelength ray entering the other two ports of the triple-core optical fiber collimator, the optical signal interleaver comprising:

a first beam angle deflector, which changes the angle that the incident enters the optical signal interleaver;

a polarization beam splitter/combiner, which splits the incident beam into two separate beams with orthogonal polarizations;

a first polarization rotator, which rotates the polarization of one of the separate beams so as to get two beams with the same polarization;

a polarization beam displacer, which has a displacement direction orthogonal to the two beams with the same polarization;

an optical signal interleaving mechanism, which interleaves the two beams with the same polarization to form two light signals, each having the Even-wavelength ray and the Odd-wavelength ray orthogonal in their polarizations;

a spatial displacement reflector, which reflects the two light signals with the Even-wavelength ray and the Odd-wavelength ray orthogonal in their polarizations and produces spatial displacements; and a second beam angle deflector, which deflects the traveling direction of one of the Even-wavelength ray and the Odd-wavelength ray so that they can enter the other two ports of the triple-core optical fiber collimator;

wherein the reflected light signals enter the optical signal interleaving mechanism to produce a desired spacing; the two optical signals are separated by the polarization beam displacer into an Even-wavelength ray signal and an Odd-wavelength ray signal, respectively; the polarization rotator rotates the polarizations of one of the Odd-wavelength ray signals and one of the Even-wavelength ray signals to be orthogonal to the polarizations of the other Odd-wavelength ray signal and the other Even-wavelength ray signal, respectively; and the beams pass through the polarization beam splitter/combiner to be combined into the Even-wavelength ray and the Odd-wavelength ray.

14. The optical signal interleaver of claim 13, wherein the polarization beam splitter/combiner is a birefringent crystal.

15. The optical signal interleaver of claim 13, wherein the polarization rotator is a Faraday rotator.

16. The optical signal interleaver of claim 13, wherein the polarization rotator is a half-wave plate.

17. The optical signal interleaver of claim 13, wherein the first beam angle deflector and the second beam angle deflector are optical glass.

18. The optical signal interleaver of claim 13, wherein the first beam angle deflector and the second beam angle deflector are optical crystals with a high refraction index.

19. The optical signal interleaver of claim 13, wherein the optical signal interleaving mechanism comprises a pair of birefringent plates, one of the birefringent plates generating an interleaving effect and the other stabilizing temperature.

20. The optical signal interleaver of claim 13, wherein the spatial displacement reflector comprises a reciprocal polarization rotator and a dihedral retroreflector so that the incident light signals are reflected to produce a spatial displacement and a polarization rotation by 90 degrees.

21. The optical signal interleaver of claim 20, wherein the reciprocal polarization rotator is a half-wave plate.

22. The optical signal interleaver of claim 13, wherein the spatial displacement reflector comprises a non-reciprocal polarization rotator, a convergent lens, and a highly reflective mirror disposed on the focal plane of the convergent lens so that the incident light signals are reflected to produce a spatial displacement and a polarization rotation by 90 degrees.

23. The optical signal interleaver of claim 22, wherein the non-recirpocal polarization rotator is a Faraday rotator.

24. The optical signal interleaver of claim 22, wherein the non-reciprocal polarization rotator is a quarter-wave plate.

25. A four-port optical signal interleaving circulator comprising:
a first polarization beam splitter/combiner, which splits the incident beam into two separate beams with orthogonal polarizations;
a first polarization rotator, which rotates the polarization of one of the separate beams so as to get two beams with the same polarization;
a first polarization beam displacer;
a second polarization rotator which rotates a polarization of the two beams;
a light signal interleaving mechanism, which interleaves the two beams with the same polarization to form two light signals, each having the Even-wavelength ray and the Odd-wavelength ray in their polarizations;
a second polarization beam displacer;
a third polarization rotator which rotates the polarizations of one of the Even-wavelength ray signals and the adjacent Odd-wavelength ray signal to be orthogonal to those of the other Even-wavelength ray signal and the other Odd-wavelength ray signal;
a fourth polarization rotator which rotates the polarization of the two Even-wavelength ray signals or the two Odd-wavelength ray signals to be orthogonal to the original type;
a beam angle deflector to deflect the traveling direction of the optical signals passing through; and
a second polarization beam splitter/combiner which combines the Even-wavelength ray signals with the orthogonal polarizations and the Odd-wavelength ray signals with the orthogonal polarizations into the Even-wavelength ray and the Odd-wavelength ray, respectively for output.

26. The optical signal interleaver of claim 25, wherein the first polarization beam splitter/combiner and the second polarization beam splitter/combiner are birefringent crystals.

27. The optical signal interleaver of claim 25, wherein the first polarization rotator and the second polarization rotator are Faraday rotators.

28. The optical signal interleaver of claim 25, wherein the beam angle deflector is optical glass.

29. The optical signal interleaver of claim 25, wherein the beam angle deflector is an optical crystal with a high refraction index.

30. The optical signal interleaver of claim 25, wherein the optical signal interleaving mechanism comprises a pair of birefringent plates, one of the birefringent plates generating an interleaving effect and the other stabilizing temperature.

31. A three-port optical signal interleaving bi-circulator, comprising:
a first polarization beam splitter/combiner which splits the incident beam into two separate beams with orthogonal polarizations;
a first polarization rotator, which rotates the polarization of one of the separate beams so as to get two beams with the same polarization;
an optical signal interleaving mechanism, which interleaves the two beams with the same polarization to form two light signals, each having the Even-wavelength ray and the Odd-wavelength ray in their polarizations;
a polarization beam displacer;
a second polarization rotator which rotates the polarization of one of the Even-wavelength ray signals and the non-adjacent Odd-wavelength orthogonal to those of the other Even-wavelength ray signal and the other Odd-wavelength ray signal;
a beam angle deflector; and
a second polarization beam splitter/combiner which combines the Even-wavelength ray signals with orthogonal polarizations and the Odd-wavelength ray signals with orthogonal polarizations and to the Even-wavelength ray and the Odd-wavelength ray, respectively for output.

32. The optical signal interleaver of claim 31, wherein the first polarization beam splitter/combiner and the second polarization beam splitter/combiner are birefringent crystals.

33. The optical signal interleaver of claim 31, wherein the first polarization rotator and the second polarization rotator are Faraday rotators.

34. The optical signal interleaver of claim 31, wherein the beam angle deflector is optical glass.

35. The optical signal of claim 31, wherein the beam angle deflector is an optical crystal with a high refraction index.

36. The optical signal interleaver of claim 31, wherein the optical signal interleaving mechanism comprises a pair of birefringent plates, one of the birefringent plates generating an interleaving effect and the other stabilizing temperature.

* * * * *